US012759102B2

(12) United States Patent
Yasugi

(10) Patent No.: US 12,759,102 B2
(45) Date of Patent: Oct. 13, 2026

(54) TOOL TRANSPORT SYSTEM, CONTROL METHOD FOR TOOL TRANSPORT SYSTEM, AND NON-TRANSITORY COMPUTER-READABLE MEDIUM STORING CONTROL PROGRAM FOR TOOL TRANSPORT SYSTEM

(71) Applicant: DMG MORI CO., LTD., Nara (JP)

(72) Inventor: Eisuke Yasugi, Nara (JP)

(73) Assignee: DMG MORI CO., LTD., Nara (JP)

( * ) Notice: Subject to any disclaimer, the term of this patent is extended or adjusted under 35 U.S.C. 154(b) by 562 days.

(21) Appl. No.: 18/035,437

(22) PCT Filed: Nov. 6, 2020

(86) PCT No.: PCT/JP2020/041517
§ 371 (c)(1),
(2) Date: May 4, 2023

(87) PCT Pub. No.: WO2022/097268
PCT Pub. Date: May 12, 2022

(65) Prior Publication Data
US 2023/0415286 A1 Dec. 28, 2023

(51) Int. Cl.
*B23Q 3/155* (2006.01)
*B23Q 17/00* (2006.01)

(52) U.S. Cl.
CPC ...... *B23Q 3/15503* (2016.11); *B23Q 3/15513* (2013.01); *B23Q 17/006* (2013.01)

(58) Field of Classification Search
CPC ............ B23Q 3/15503; B23Q 3/15513; B23Q 17/006
(Continued)

(56) References Cited

U.S. PATENT DOCUMENTS

2016/0202690 A1* 7/2016 Kawai .............. G05B 19/40938 700/169
2022/0155750 A1* 5/2022 Matsui ............... G05B 19/4069
(Continued)

FOREIGN PATENT DOCUMENTS

EP 4390588 A1 * 6/2024 ............. G06Q 50/04
JP S6263052 A 3/1987
(Continued)

*Primary Examiner* — Md Azad
(74) *Attorney, Agent, or Firm* — IP Business Solutions, LLC.

(57) ABSTRACT

A tool transport system includes a display unit, a plurality of machine tools, a tool storage unit, a transport device for transporting a designated tool among tools stored in the tool storage unit to a designated machine tool among the plurality of machine tools and a controller for controlling the tool transport system. The controller executes a process of acquiring stocked tool information defining identification information of each tool stocked by the tool transport system, a process of specifying a plurality of tools to be used in the plurality of machine tools on the basis of a machining schedule of workpiece in the plurality of machine tools, a process of specifying an unstocked tool that is not defined in the stocked tool information among the plurality of tools to be used, and a process of displaying identification information of the unstocked tool on the display unit.

9 Claims, 21 Drawing Sheets

(58) Field of Classification Search
USPC .......................................................... 700/179
See application file for complete search history.

(56) References Cited

U.S. PATENT DOCUMENTS

| | | | | |
|---|---|---|---|---|
| 2023/0099602 | A1* | 3/2023 | Hashiguchi | G05B 19/418 700/245 |
| 2023/0297087 | A1* | 9/2023 | Tarui | G05B 19/4183 700/100 |

FOREIGN PATENT DOCUMENTS

| | | | |
|---|---|---|---|
| JP | H01216754 | A | 8/1989 |
| JP | H04256537 | A | 9/1992 |
| JP | H0584631 | A | 4/1993 |
| JP | H0631599 | A | 2/1994 |
| JP | H06-079591 | A | 3/1994 |
| JP | 2004195581 | A | 7/2004 |
| JP | 6775704 | B1 | 10/2020 |
| WO | 2015029232 | A1 | 3/2015 |

* cited by examiner

FIG.5

123

| KIND OF WORKPIECE | NUMBER OF WORKPIECES |
|---|---|
| WORKPIECE A | 10 |
| WORKPIECE D | 8 |
| WORKPIECE C | 5 |
| WORKPIECE B | 4 |
| ⋮ | ⋮ |

MACHINING ORDER ↓

FIG.6

124

| KIND OF WORKPIECE | MACHINING PROGRAM | TOOL TO BE USED | MACHINING TIME (min) | ... |
|---|---|---|---|---|
| WORKPIECE A | PROGRAM A | TOOLS A, C, D | 15 | ... |
| WORKPIECE B | PROGRAM B | TOOLS B, E | 20 | ... |
| WORKPIECE C | PROGRAM C | TOOL D | 25 | ... |
| WORKPIECE D | PROGRAM C | TOOLS C, D | 35 | ... |
| ⋮ | ⋮ | ⋮ | ⋮ | ⋮ |

FIG.9

130

| IDENTIFICATION INFORMATION | | ATTRIBUTION INFORMATION | | |
|---|---|---|---|---|
| TOOL ID | KIND OF TOOL | TOOL DIAMETER | TOOL LENGTH | ... |
| 000001 | TOOL A | r1 | d1 | ... |
| 000002 | TOOL B | r2 | d2 | ... |
| 000003 | TOOL C | – | – | ... |
| ⋮ | ⋮ | ⋮ | ⋮ | ⋮ |

FIG.10

80

90 (90A–90F) 91 (91A–91F)

| Cutting plan on MC | | | | | | Preparation plan | | | | | |
|---|---|---|---|---|---|---|---|---|---|---|---|
| | | | | | | | Transfer Source Tool Data | | | | |
| Seq. (90A) | Date (90B) | Time (90C) | Equip -ment (90D) | Tool Group (90E) | Cutting Time (90F) | In MC Tool Sum (Before Machining) (91A) | Location (91B) | Tool ID (91C) | Next New Tool Serial (91D) | Remain Life (91E) | Transfer Status (91F) |
| – | – | – | – | – | min | min | – | – | – | min | – |
| 1 | 16-Jul | 16:20 | MC_01 | 000,002 | 15 | 0 | CTS_01 | 10,000,001 | – | 888 | Finished |
| 2 | 16-Jul | 16:20 | MC_01 | 000,003 | 18 | 0 | Floor | 10,000,002 | – | 1500 | Not yet |
| 3 | 16-Jul | 16:20 | MC_02 | 000,002 | 15 | 0 | Short | – | 02 | 1200 | Not yet |
| 4 | 16-Jul | 16:20 | MC_02 | 000,003 | 18 | 0 | Robot | 10,000,401 | – | 1500 | Ongoing |
| 5 | 16-Jul | 16:20 | MC_02 | 000,004 | 7 | 0 | Robot | 12,647,121 | – | 800 | Ongoing |
| 6 | 16-Jul | 16:20 | MC_01 | 200,001 | 21 | 0 | Short | – | 09 | 1300 | Not yet |
| 7 | 16-Jul | 16:20 | MC_01 | 200,005 | 25 | 0 | TSS | 30,000,001 | – | 1600 | Not yet |
| 8 | 16-Jul | 16:20 | MC_01 | 000,002 | 15 | 873 | – | – | – | – | – |
| 9 | 16-Jul | 16:20 | MC_01 | 000,003 | 18 | 1482 | – | – | – | – | – |
| : | : | : | : | : | : | : | : | : | : | : | : |

FIG.12

128A

| STOCKED TOOLS | NUMBER OF TOOLS |
|---|---|
| TOOL A | 6 |
| TOOL B | 3 |
| TOOL C | 5 |
| TOOL D | 6 |
| TOOL E | 5 |
| ⋮ | ⋮ |

FIG.15

174

| STORAGE LOCATION | COORDINATES | TOOL | STATE | RESIDUAL SERVICE LIFE |
|---|---|---|---|---|
| 0001 | $x_1$ , $z_1$ | T1001 | NORMAL | 1800 min/2000 min |
| 0002 | $x_2$ , $z_2$ | T1002 | SERVICE LIFE ALARM | 100/1000 min |
| 0003 | $x_3$ , $z_3$ | T1003 | SERVICE LIFE | 0 |
| 0004 | $x_4$ , $z_4$ | — | VACANT | — |
| ⋮ | ⋮ | ⋮ | ⋮ | ⋮ |

TOOL TRANSPORT SYSTEM, CONTROL METHOD FOR TOOL TRANSPORT SYSTEM, AND NON-TRANSITORY COMPUTER-READABLE MEDIUM STORING CONTROL PROGRAM FOR TOOL TRANSPORT SYSTEM

TECHNICAL FIELD

The present disclosure relates to a technique for managing tools stocked by a tool transport system.

BACKGROUND ART

An increased number of companies have administered a plurality of machine tools. As the number of machine tools to be administered increases, it becomes difficult to manage tools used in each machine tool. In this respect, PTL 1 (WO2015/029232) discloses a tool management system that manages tools to be used in a plurality of machine tools.

CITATION LIST

Patent Literature

PTL 1: WO2015/029232

SUMMARY OF THE INVENTION

Technical Problem

In recent years, development of a tool transport system is being advanced. The tool transport system automatically transports tools required in a designated machine tool among a plurality of machine tools. The tool management system disclosed in PTL 1 does not relate to such a tool transport system.

A tool transport system includes a plurality of machine tools, a tool storage unit for storing a plurality of tools, and a transport device such as a robot. The transport device takes a designated tool out of the tool storage unit, and carries the tool into a designated machine tool. Also, the transport device carries a tool that has been used out of a machine tool, and returns the tool to the tool storage unit. Thus, tools in the tool storage unit are shared by a plurality of machine tools.

Tools to be used in machining in each machine tool are required to be set in advance in the tool transport system by an operator. However, when an operator is notified that a tool to be used is not stocked by the tool transport system directly before starting the machining, the operator cannot prepare the tool immediately. This results in delay in starting of the machining. Therefore, there is a demand for a technique for notifying an operator of the tool to be used that is not stocked by the tool transport system in advance.

Solution to Problem

In one example of the present disclosure, a tool transport system includes a display unit, a plurality of machine tools, a tool storage unit that stores a plurality of tools, a transport device that transports a designated tool among tools stored in the tool storage unit, to a designated machine tool among the plurality of machine tools, and a controller that controls the tool transport system. The controller executes a process of acquiring stocked tool information defining identification information of each tool stocked by the tool transport system, a process of specifying a plurality of tools to be used in the plurality of machine tools on the basis of a machining schedule of workpiece in the plurality of machine tools, a process of specifying an unstocked tool that is not defined in the stocked tool information among the plurality of tools to be used, and a process of displaying identification information of the unstocked tool on the display unit.

In one example of the present disclosure, the tool transport system further includes a tool database. The tool database includes identification information of a plurality of tools. The controller further executes a process of associating attribution information of tool to identification information of the tool in the tool database based on reception of input of the attribution information of the tool, and a process of displaying information indicating whether or not the attribution information of the unstocked tool is registered in the tool database on the display unit.

In one example of the present disclosure, the tool transport system is configured to be communicable with a communication terminal. The controller further executes a process of transmitting identification information of an unstocked tool for which the attribution information is not registered in the tool database to the communication terminal.

In one example of the present disclosure, the controller executes a process of calculating a remaining time for the unstocked tool to become required in the tool transport system from the present time based on the machining schedule, and a process of displaying the remaining time for the unstocked tool on the display unit.

In one example of the present disclosure, the controller displays identification information of an unstocked tool for which the remaining time is shortest among the unstocked tools on the display unit while more highlighting the identification information of the unstocked tool than identification information of other unstocked tools.

In other example of the present disclosure, there is provided a control method for a tool transport system. The tool transport system includes a display unit, a plurality of machine tools, a tool storage unit that stores a plurality of tools, and a transport device that transports a designated tool among tools stored in the tool storage unit, to a designated machine tool among the plurality of machine tools. The control method includes acquiring stocked tool information defining identification information of each tool stocked by the tool transport system, specifying a plurality of tools to be used in the plurality of machine tools based on a machining schedule of workpiece in the plurality of machine tools, specifying an unstocked tool that is not defined in the stocked tool information among the plurality of tools to be used, and displaying identification information of the unstocked tool on the display unit.

In other example of the present disclosure, there is provided a control program for a tool transport system. The tool transport system includes a display unit, a plurality of machine tools, a tool storage unit that stores a plurality of tools, a transport device that transports a designated tool among tools stored in the tool storage unit, to a designated machine tool among the plurality of machine tools, and a controller that controls the tool transport system. The control program makes the controller execute acquiring stocked tool information defining identification information of each tool stocked by the tool transport system, specifying a plurality of tools to be used in the plurality of machine tools based on a machining schedule of workpiece in the plurality of machine tools, specifying an unstocked tool that is not defined in the stocked tool information among the plurality of tools to be used, and displaying identification information of the unstocked tool on the display unit.

The foregoing and other objects, features, aspects and advantages of the present invention will become more apparent from the following detailed description of the present invention when taken in conjunction with the accompanying drawings.

BRIEF DESCRIPTION OF DRAWINGS

FIG. 5 is a chart showing one example of data structure of machining setting.

FIG. 6 is a chart showing one example of data structure of workpiece database.

FIG. 9 is a chart showing one example of data structure of tool database.

FIG. 10 is a chart showing one example of output mode by an outputting unit.

FIG. 12 is a chart showing stocked tool information.

FIG. 15 is a chart showing one example of data structure of storage information.

DESCRIPTION OF EMBODIMENTS

Figure 1:
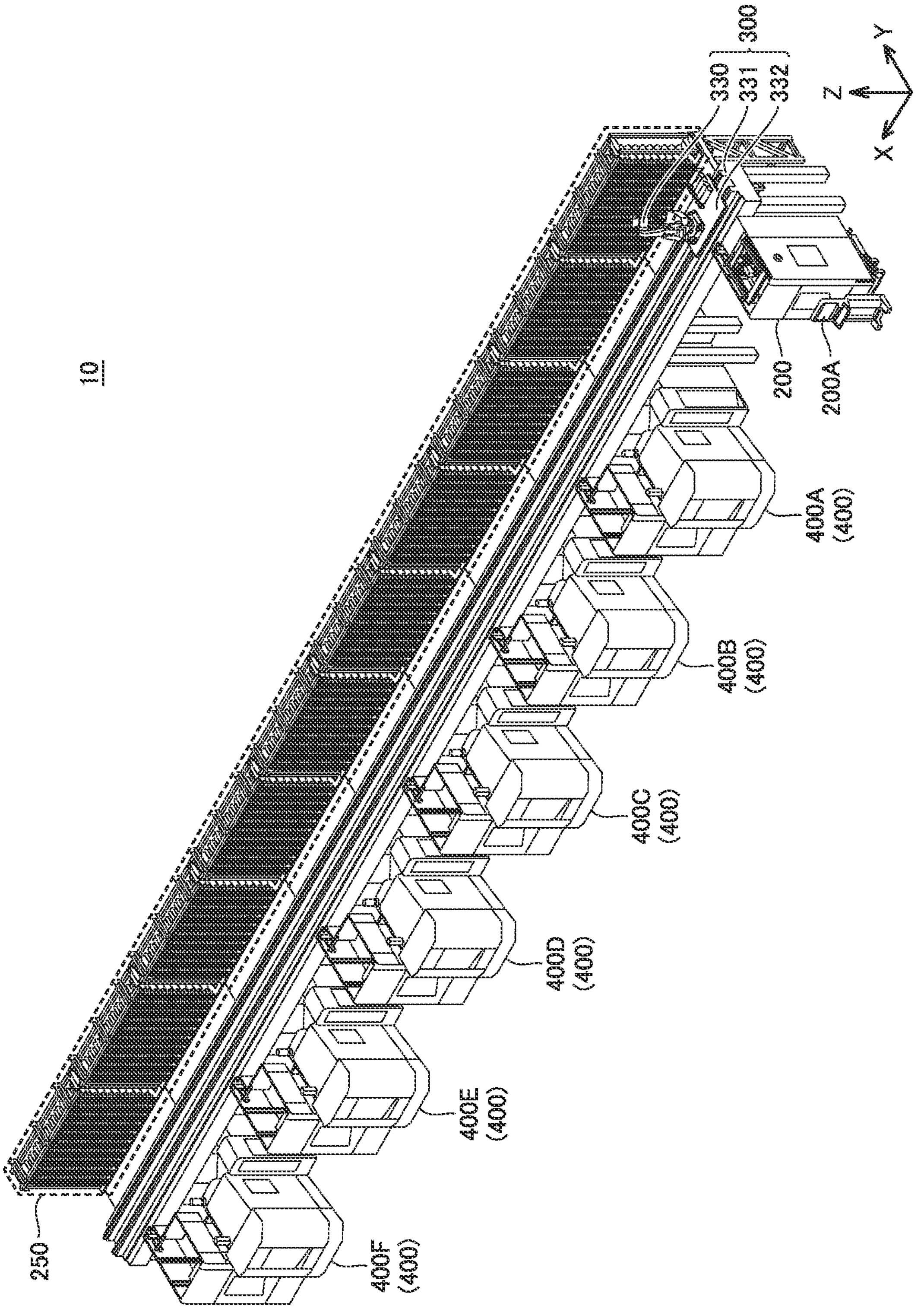
FIG. 1 is a view showing an appearance of a tool transport system.

Hereinafter, each embodiment according to the present invention will be described by referring to the drawings. In the following description, the same parts and constituents are denoted by the same reference numeral. The names and functions of these are also the same. Therefore, detailed description is not repeated for these.

Each embodiment and each modified example described below may be appropriately and selectively combined.

A. Appearance of Tool Transport System 10

Referring to FIG. 1, a tool transport system 10 is described. FIG. 1 is a view showing an appearance of tool transport system 10.

As shown in FIG. 1, tool transport system 10 includes a tool setup device 200, a tool storage unit 250, a transport device 300, and a machine tool 400.

The "transport device" referred in the present description is a concept including various devices having the function of transporting a tool. Hereinafter, description is made for a four to seven-axis driven multi joint robot as one example of transport device 300, however, transport device 300 is not limited to the multi joint robot. As one example, transport device 300 may be a two to three-axis driven orthogonal robot (autoloader). Alternatively, transport device 300 may be a self-propelled robot.

Also, "machine tool" referred in the present description is concept including various devices having the function of machining a workpiece. Machine tool 400 may be a horizontal type machining center, and may be a vertical type machining center. Alternatively, machine tool 400 may be a lathe, may be an additive machine tool, and may be other cutting tool or a grinding tool.

Hereinafter, for convenience of description, the direction corresponding to the moving direction of transport device 300 is defined as "X direction". X direction is one direction on a horizontal plane. The direction orthogonal to the X direction is defined as "Y direction". Y direction is one direction on the horizontal plane. Also, the direction orthogonal to both of X direction and Y direction is defined as "Z direction". "Z direction" is a vertical direction (gravity direction).

Tool setup device 200 includes an operation terminal 200A. Operation terminal 200A receives various operations to tool transport system 10. An operator sets a tool to be carried-in in tool setup device 200. Then, the operator conducts a carry-in starting operation on operation terminal 200A, and thus the tool to be carried-in is carried into tool storage unit 250 by transport device 300.

Tool storage unit 250 is one of transport destinations for tool by transport device 300. A plurality of tools can be stored in tool storage unit 250. Typically, tool storage unit 250 is disposed in parallel with a rail 331.

Transport device 300 transports a designated tool among the tools stored in tool storage unit 250 to a designated machine tool among plurality of machine tools 400A to 400E. As one example, transport device 300 includes an arm robot 330, rail 331, and a carriage 332. Arm robot 330 is fixed on carriage 332. Carriage 332 is capable of moving on rail 331. Tool storage unit 250 and machine tool 400 are arranged in parallel with each other along rail 331 to sandwich rail 331 therebetween. Transport device 300 transports a tool between tool setup device 200 and tool storage unit 250, and transports a tool between tool storage unit 250 and machine tool 400.

Machine tool 400 is one of transport destinations for tool by transport device 300. While FIG. 1 shows six machine tools 400A to 400F as machine tool 400, the number of machine tool 400 provided in tool transport system 10 may be one or more. Machine tool 400 machines a workpiece using a designated tool in accordance with a machining program designed in advance.

Tool transport system 10 may further include a pallet transport system (not shown). The pallet transport system is a system for transporting a pallet on which a workpiece is placed to machine tool 400 according to a predetermined machining schedule.

B. Driving Mechanism of Tool Transport System 10

Figure 2:
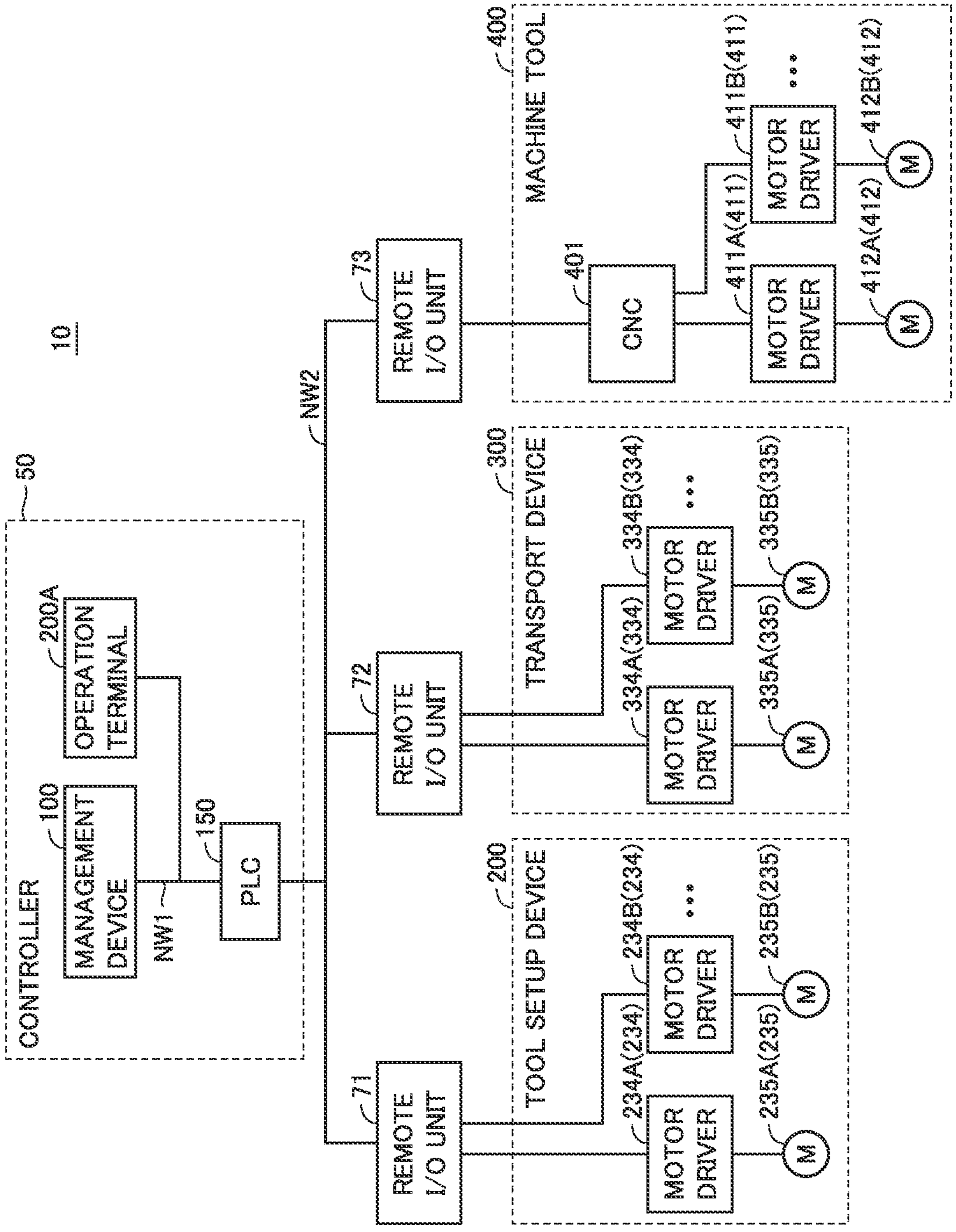
FIG. 2 is a diagram showing a configuration example of a driving mechanism of the tool transport system.

Next, referring to FIG. 2, various driving mechanisms in tool transport system are described. FIG. 2 is a diagram showing a configuration example of a driving mechanism of tool transport system 10.

As shown in FIG. 2, tool transport system 10 includes a controller 50, remote I/O (Input/Output) units 71 to 73, tool setup device 200, transport device 300, and machine tool 400.

"Controller 50" referred in the present description means a device that controls tool transport system 10. A device configuration of controller 50 is ad libitum. Controller 50 may be configured by a single control unit and may be configured by a plurality of control units. In the example of FIG. 2, controller 50 is configured by a management device 100, a PLC 150, and operation terminal 200A described above.

Management device 100 is a main computer that manages tool transport system 10. Management device 100 may be configured by a single computer, or may be configured by a plurality of computers. As one example, management device 100 is configured by a computer responsible for tool transport, and a computer responsible for pallet transport.

PLC 150 controls various industrial devices for automating a machining process. Operation terminal 200A is a terminal for receiving various operations regarding carry-out and carry-in of tool.

Management device 100, PLC 150, and operation terminal 200A are connected to a network NW1. Management device 100, PLC 150, and operation terminal 200A may be communication connected by wire and may be communication connected wirelessly. For Network NW1, EtherNET (registered trademark) or the like is employed. Management device 100 and operation terminal 200A send a control command to PLC 150 via network NW1. According to the control command, a tool to be transported, a transport destination of the tool, start/stop of transport of the tool and the like are designated.

Remote I/O units 71 to 73 and PLC 150 are connected to network NW2. As network NW2, it is preferred to employ a field network that conducts fixed-cycle communication with which data arrival time is ensured. As such a field network that conducts fixed-cycle communication, for example, EtherCAT (registered trademark), EtherNet/IP (registered trademark), CC-Link (registered trademark), or CompoNet (registered trademark) is employed.

Tool setup device 200 includes one or more motor driver 234, and one or more motor 235. In the example of FIG. 2, two motor drivers 234A, 234B and two motors 235A, 235B are shown.

Inside tool setup device 200 or in the vicinity of tool setup device 200, remote I/O unit 71 is disposed. Remote I/O unit 71 mediates data exchange between various driving units (for example, motor driver 234) inside tool setup device 200, and PLC 150. As one example, motor driver 234 receives a control command at a fixed cycle from PLC 150 via remote I/O unit 71, and controls driving of motor 235 according to the control command.

Motor 235A controls, for example, driving of a later-described magazine M1 (see FIG. 14). Motor 235B controls, for example, driving of an ATC (Automatic Train Control) in tool setup device 200.

Motor driver 234 may be, for example, a driver for servo motor, and may be a driver for stepping motor. Motor 235 may be a servo motor, and may be a stepping motor.

Transport device 300 includes one or more motor driver 334, and one or more motor 335. In the example of FIG. 2, two motor drivers 334A, 334B and two motors 335A, 335B are shown.

Inside transport device 300 or in the vicinity of transport device 300, remote I/O unit 72 is disposed. Remote I/O unit 72 mediates data exchange between various driving units (for example, motor driver 334) inside transport device 300, and PLC 150. As one example, motor driver 334 receives a control command at a fixed cycle from PLC 150 via remote I/O unit 72, and controls driving of motor 335 according to the control command.

Motor 335A controls, for example, driving of carriage 332 (see FIG. 1) described above. Motor 335B controls, for example, driving of arm robot 330 (see FIG. 1). Motor 335B is provided in accordance with the number of joints of arm robot 330.

Motor driver 334 may be, for example, a driver for servo motor, and may be a driver for stepping motor. Motor 335 may be a servo motor, and may be a stepping motor.

Machine tool 400 includes a CNC (Computer Numerical Control) 401, one or more motor driver 411, and one or more motor 412. In the example of FIG. 2, two motor drivers 411A, 411B and two motors 412A, 412B are shown.

Inside machine tool 400 or in the vicinity of machine tool 400, remote I/O unit 72 is disposed. Remote I/O unit 72 mediates data exchange between various driving units (for example, CNC 401) inside machine tool 400, and PLC 150. Likewise motor driver 334, motor driver 411 receives a control command at a fixed cycle from PLC 150 via remote I/O unit 72, and controls driving of motor 412 according to the control command.

Motor 412A drives, for example, a main shaft capable of attachment of a tool in the axial direction of the main shaft. Motor 412B rotationally drives, for example, a main shaft in the rotary direction about the axial direction of the main shaft.

Motor driver 411 may be, for example, a driver for servo motor, and may be a driver for stepping motor. Motor 412 may be a servo motor, and may be a stepping motor.

C. Outline

It is necessary for an operator to carry a tool to be used in machine tool 400 in machining (hereinafter, also referred to as "tool to be used") into tool transport system in advance. However, when an operator is notified that a tool to be used is not stocked by tool transport system 10 directly before starting the machining, the operator cannot prepare the tool to be used immediately. For addressing to this, tool transport system 10 notifies the operator of an unstocked tool to be used in advance. Accordingly, the operator has enough time to prepare the tool to be used, and can carry the tool to be used into machine tool 400 before starting of machining.

Figure 3:
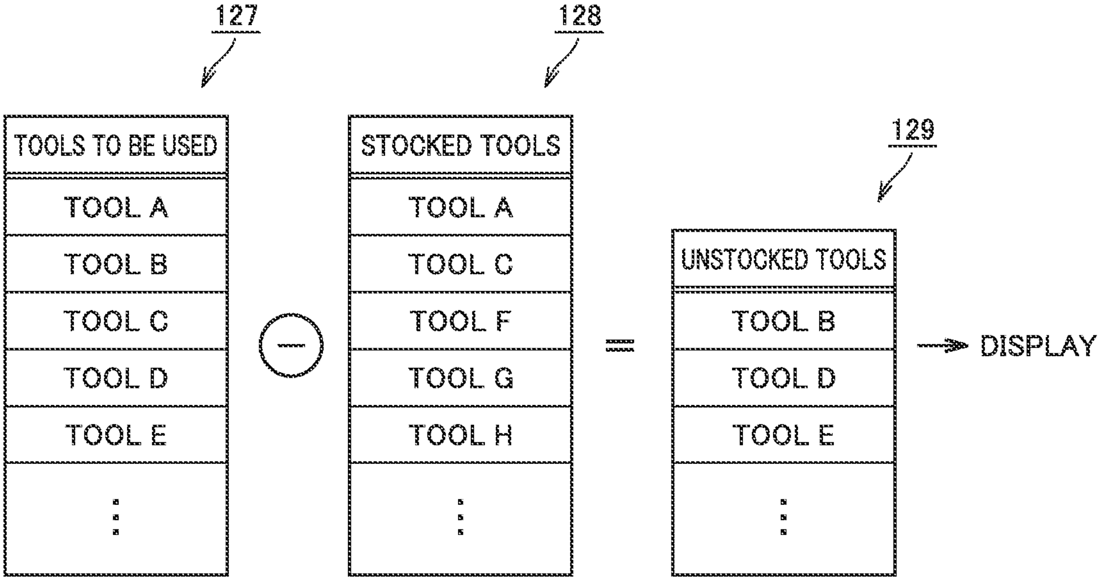
FIG. 3 is a chart schematically showing a process of extracting an unstocked tool to be used.

Referring to FIG. 3, outline of a method for extracting an unstocked tool is described. FIG. 3 is a chart schematically showing a process of extracting an unstocked tool to be used.

First, controller 50 of tool transport system 10 acquires tool-to-be-used information 127. In tool-to-be-used information 127, identification information of each tool to be used in all machine tools 400 within a predetermined time from the present is defined. The identification information is information for uniquely identifying a tool. For example, the identification information may be a tool name, may be a tool ID (Identification), and may be an image of tool. A tool to be used is specified, for example, on the basis of a machining schedule of workpiece in machine tool 400. The details of the method for specifying a tool to be used are described later.

Next, controller 50 of tool transport system 10 acquires stocked tool information 128. In stocked tool information 128, identification information of each tool stocked by tool transport system 10 is defined. It is to be noted that identification information of a tool that is unusable due to the reasons such as fracture or wear need not be defined in stocked tool information 128.

Next, controller 50 specifies an unstocked tool that is not defined in stocked tool information 128 among tools to be used defined in tool-to-be-used information 127. In the example of FIG. 3, tools "A" to "E" are defined in tool-to-be-used information 127, and tools "A", "C", "F", "G", "H" are defined in stocked tool information 128. In this case, controller 50 specifies tools "B", "D", "E" that are not defined in stocked tool information 128 among tools to be used defined in tool-to-be-used information 127, as unstocked tools. Identification information of specified unstocked tools is written into, for example, unstocked tool information 129.

Thereafter, controller 50 displays identification information of each tool defined in unstocked tool information 129 on a display (display unit) of tool transport system 10. As one example, the display is a display of operation terminal 200A (see FIG. 1).

In the manner as described above, tool transport system 10 is capable of notifying an operator of an unstocked tool to be used before starting of machining. Accordingly, the operator has enough time to prepare the unstocked tool to be used.

D. Functional Constituents of Tool Transport System 10

Figure 4:
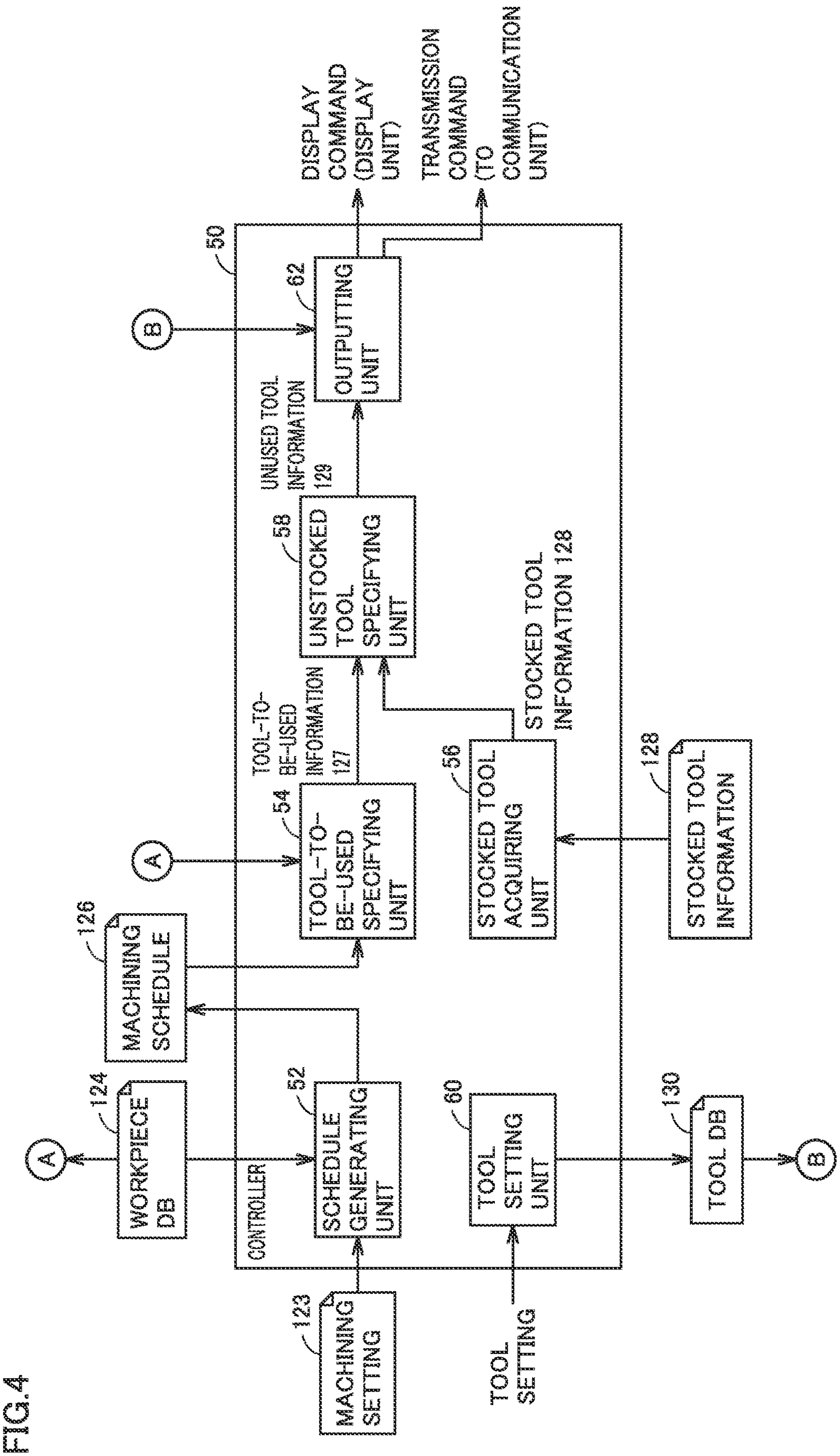
FIG. 4 is a diagram showing one example of functional constituents of the tool transport system.

Next, referring to FIG. 4 to FIG. 10, functional constituents for realizing a notifying function for unstocked tool are described. FIG. 4 is a diagram showing one example of functional constituents of tool transport system 10.

As shown in FIG. 4, tool transport system 10 includes, as functional constituents, a schedule generating unit 52, a tool-to-be-used specifying unit 54, a stocked tool acquiring unit 56, an unstocked tool specifying unit 58, a tool setting unit and an outputting unit 62. Hereinafter, these constituents are sequentially described.

The arrangement of the functional constituents is ad libitum. As one example, all the functional constituents shown in FIG. 4 may be implemented in management device 100 (see FIG. 2) described above, may be implemented in PLC 150 (see FIG. 2) described above, and may be implemented in operation terminal 200A (see FIG. 2) described above. Alternatively, part of the functional constituents shown in FIG. 4 may be implemented in management device 100, part of the remaining functional constituents may be implemented in PLC 150, and the remaining functional constituents may be implemented in operation terminal 200A. Alternatively, part of the functional constituents shown in FIG. 4 may be implemented in an external device such as a server, and may be implemented in dedicated hardware.

(D1. Schedule Generating Unit 52)

Figure 7:
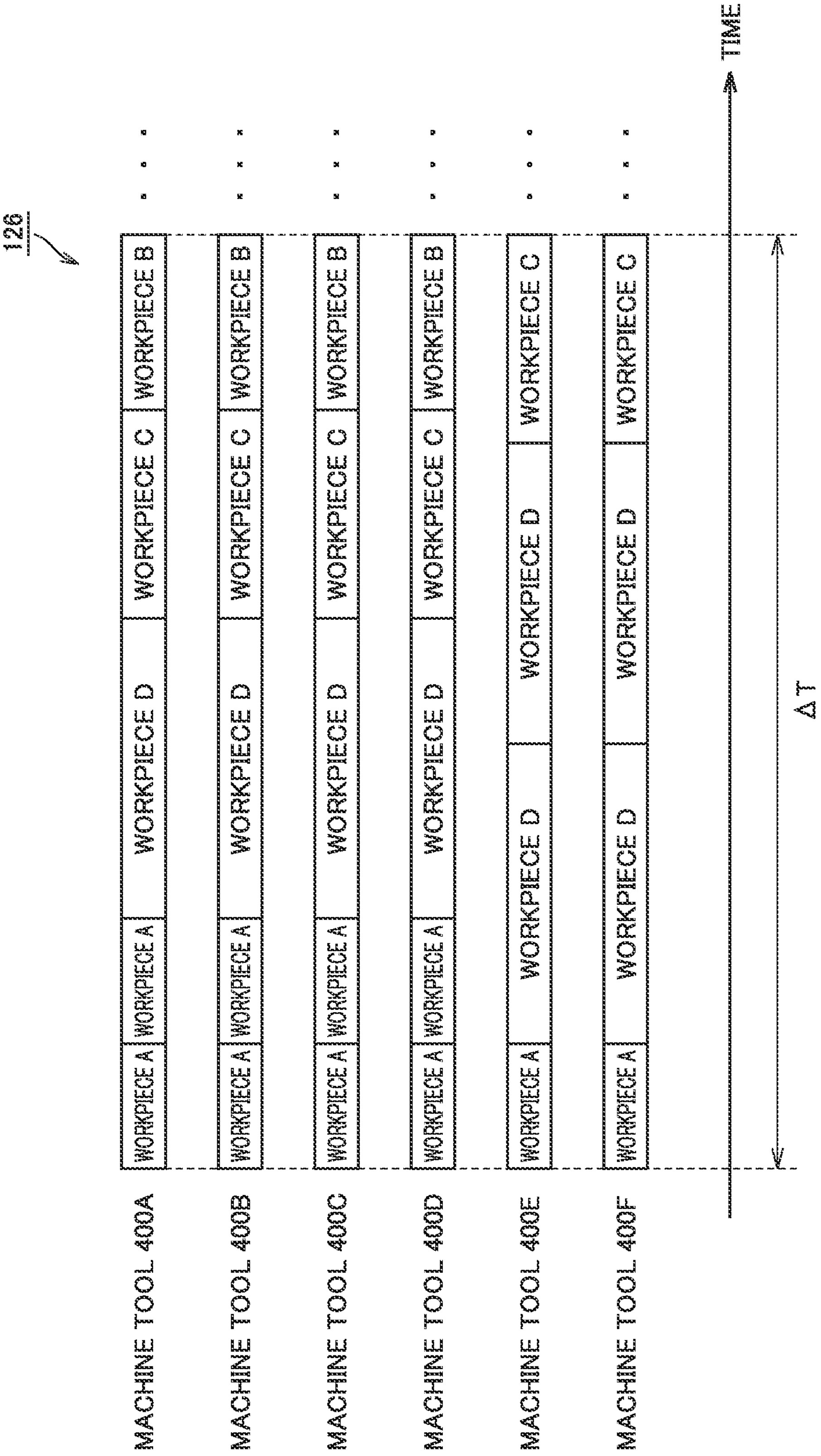
FIG. 7 is a chart showing a machining schedule as one example.

First, referring to FIG. 5 to FIG. 7, functions of schedule generating unit 52 shown in FIG. 4 are described.

Schedule generating unit 52 generates a machining schedule 126 shown in FIG. 7 on the basis of a machining setting 123 shown in FIG. 5, and a workpiece database 124 shown in FIG. 6.

FIG. 5 is a chart showing one example of data structure of machining setting 123. An operator preliminarily registers workpieces to be machined by registering machining setting 123. Machining setting 123 is registered, for example, by the operator in management device 100 described above, or operation terminal 200A described above and the like. Contents registered by the operator include identification information of workpieces to be machined, the number of workpieces to be machined, and a machining order of workpieces.

In the example of FIG. 5, a machining task for ten workpieces "A" for which machining time is 15 minutes, a machining task for eight workpieces "D" for which machining time is 35 minutes, a machining task for five workpieces "C" for which machining time is 25 minutes, and a machining task for four workpieces "B" for which machining time is 35 minutes are registered in the order of machining as machining setting 123.

FIG. 6 is a chart showing one example of data structure of workpiece database 124. As one example, in workpiece database 124, a machining program for realizing machining of workpiece, a tool to be used in machining of workpiece, a machining time required for machining of workpiece, and other information regarding machining of workpiece for each identification information of workpiece.

The machining program defined in workpiece database 124 is registered by an operator, for example, in management device 100 described above, operation terminal 200A described above, or machine tool 400 described above and the like. The method for generating the machining program is ad libitum. As one example, some machine tools 400 have a function of automatically generating a machining program by an operator answering questions in dialogue form. A machining program is generated, for example, by such a function. Alternatively, the machining program may be designed by writing of a program code by an operator.

A tool to be used defined in workpiece database 124 is, for example, preliminarily set by a user. Alternatively, the tool to be used may be specified from a machining program. More specifically, a command code for invoking a tool to be used is defined in the machining program. The command code is, for example, a T code for designating a tool to be attached to the main shaft. Schedule generating unit 52 specifies identification information of the tool to be used in machining of each workpiece by searching each machining program for the T code.

The machining time defined in workpiece database 124 is, for example, preliminarily inputted by an operator. Alternatively, the machining time may be calculated from the past actual results of each workpiece.

By referring to workpiece database 124, schedule generating unit 52 specifies a machining time for each workpiece defined in machining setting 123. Next, schedule generating unit 52 generates machining schedule 126 on the basis of the specified machining time, the number of each workpiece defined in machining setting 123, and a machining order of each workpiece defined in machining setting 123.

FIG. 7 is a chart showing machining schedule 126 as one example. In machining schedule 126, a machining task of workpiece in each of machine tools 400 is defined.

In the example of FIG. 7, a machining task for two workpieces "A", a machining task for one workpiece "D", a machining task for one workpiece "C", and a machining task for one workpiece "B" are assigned to each of machine tools 400A to 400D. To each of machine tools 400E, 400F, a machining task for one workpiece "A", a machining task for two workpieces "D", and a machining task for two workpieces "C" are assigned.

The machining tasks for workpiece are not necessarily be assigned according to the order of machining of workpiece. As one example, machining tasks for workpiece may be assigned such that the same kind of workpieces are assigned to the same machine tool 400.

(D2. Tool-to-be-Used Specifying Unit 54)

Figure 8:
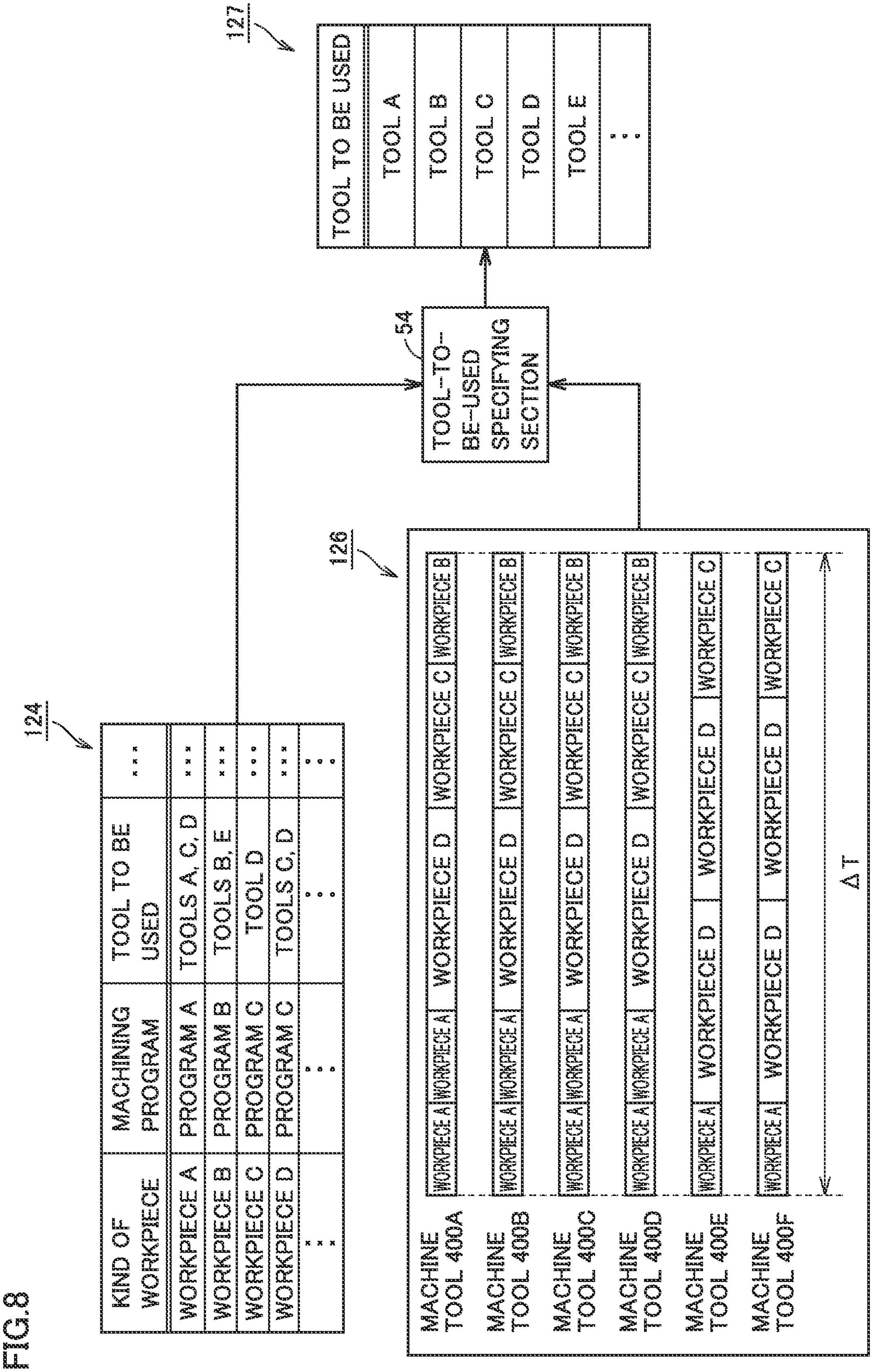
FIG. 8 is a diagram schematically showing a process of specifying a tool to be used.

Next, referring to FIG. 8, function of tool-to-be-used specifying unit 54 shown in FIG. 4 is described. FIG. 8 is a diagram schematically showing a process of specifying a tool to be used.

Tool-to-be-used specifying unit 54 specifies a tool to be used in machine tools 400A to 400F on the basis of machining schedule 126 of workpiece in machine tools 400A to 400F.

More specifically, first, tool-to-be-used specifying unit 54 extracts information of the period from the present to a predetermined time ΔT past in machining schedule 126. The length of time ΔT can be set ad libitum by a user. The length of time ΔT is set, for example, to be several minutes or several hours.

Next, tool-to-be-used specifying unit 54 specifies a tool to be used in machining of each workpiece defined in machining schedule 126 by referring to workpiece database 124 described above, and outputs identification information of the tool to be used as tool-to-be-used information 127.

(D3. Stocked Tool Acquiring Unit 56)

Next, referring to the above FIG. 3, function of stocked tool acquiring unit 56 shown in FIG. 4 is described.

Stocked tool acquiring unit 56 acquires stocked tool information 128. In stocked tool information 128, identification information of each tool stocked by tool transport system 10 is defined. As one example, stocked tool information 128 includes identification information of tools stocked by tool setup device 200, identification information of tools stored in stored in tool storage unit 250, identification information of tools stocked by transport device 300, and identification information of tools stocked by all machine tools 400.

Stocked tool information 128 is managed, for example, by management device 100 (see FIG. 2). On the basis that a tool is set in tool setup device 200, management device 100 writes identification information of the tool into stocked tool information 128. Also, on the basis of removal of a tool from tool setup device 200, management device 100 deletes identification information of the tool from stocked tool information 128.

(D4. Unstocked Tool Specifying Unit 58)

Next, referring to the above FIG. 3, function of unstocked tool specifying unit 58 shown in FIG. 4 is described.

Unstocked tool specifying unit 58 specifies an unstocked tool to be used in machine tools 400A to 400E on the basis of tool-to-be-used information 127 described above and stocked tool information 128 described above. Typically, unstocked tool specifying unit 58 specifies a tool that is not defined in stocked tool information 128 among tools to be used defined in tool-to-be-used information 127 as an unstocked tool to be used.

(D5. Tool Setting Unit 60)

Next, referring to FIG. 9, function of tool setting unit 60 shown in FIG. 4 is described.

Tool setting unit 60 receives input regarding tool setting. Tool setting is input, for example, by an operator or a manager. The contents input by each operator include, for example, attribution information of tool. The attribution information is information representing characteristics of tool such as tool shapes or tool states. As one example, the attribution information includes tool diameter, tool length, and tool service life. The tool diameter indicates a diameter of tool in the direction orthogonal to the axial direction of the main shaft. The tool length indicates a length of tool in the axial direction of the main shaft. The tool service life is an index for the timing in which the tool should be changed. The tool service life is indicated, for example, by a usable time or a usable number of times.

Attribution information is input using, for example, an input device such as a keyboard or mouse. The input device is, for example, a later-described input device 108 of management device 100 (see FIG. 18), a later-described input device 208 of operation terminal 200A (see FIG. 20), or an input device of other device. On the basis of reception of input of attribution information of a tool, tool setting unit 60 associates the attribution information with identification information of the tool in tool database 130.

FIG. 9 is a chart showing one example of data structure of tool database 130. Tool database 130 includes identification information of a plurality of tools. As shown in FIG. 9, a tool whose attribution information has been registered is associated with attribution information, and a tool whose attribution information has not been registered is not associated with attribution information.

(D6. Outputting Unit 62)

Next, function of outputting unit 62 shown in FIG. 4 is described.

Outputting unit 62 outputs an unstocked tool to be used, specified by unstocked tool specifying unit 58 to a predetermined output destination. The output destination of the unstocked tool by outputting unit 62 is ad libitum.

In a certain aspect, the output destination is a display unit in tool transport system 10. The display unit is, for example, a display of operation terminal 200A (see FIG. 1). Accordingly, the unstocked tool to be used is displayed on the display, and the operator can grasp the unstocked tool.

In other aspect, the output destination is a speaker (not shown) provided in tool transport system 10. Accordingly, the unstocked tool to be used is output by voice, and the operator can grasp the unstocked tool.

In other aspect, the output destination is a communication terminal (not shown) that is communicable with tool transport system 10. The communication terminal may be a desktop PC (Personal Computer), may be a notebook PC, and may be a portable device such as a smartphone and a tablet terminal. Accordingly, the unstocked tool to be used is sent to the communication terminal, and the user of the communication terminal can grasp the unstocked tool.

FIG. 10 is a chart showing one example of output mode by outputting unit 62. In FIG. 10, an output screen 80 is shown as one example of an output mode by outputting unit 62.

Output screen 80 is displayed, for example, in a display unit in tool transport system 10, or a display unit of a communication terminal communicable with tool transport system 10.

Output screen 80 includes at least identification information of an unstocked tool to be used. As one example, output screen 80 includes a machining schedule 90, and tool information 91.

Machining schedule 90 includes part of or all information of machining schedule 126 (see FIG. 7) described above. As one example, machining schedule 90 includes a sequence number 90A indicating execution order of machining task, date information 90B indicating machining date, machining start information 90C indicating machining start time, identification information 90D of machine tool that performs machining, a tool group 90E indicating a tool group to be used in machining, and machining time information 90F indicating time required for machining.

Tool information 91 includes part or all information of tool database 130 (see FIG. 9) described above. As one example, tool information 91 includes, for example, remaining time information 91A indicating remaining time until the tool becomes required, storage location information 91B indicating storage location of tool, tool identification information 91C, reference information 91D in preparing tool, service life information 91E indicating time remaining until service life of tool ends, and 91F indicating transport state of tool.

The operator can grasp where the tool to be used resides by checking storage location information 91B. Storage location information 91B includes information indicating that storage location is tool setup device 200 (for example, TSS), information indicating that storage location is tool storage unit 250 (for example, CTS_01), information indicating that storage location is transport device 300 (for example, Robot), and information indicating that no tool is stocked (for example, Floor or Short).

An unstocked tool to be used is more highlighted than other tools. The method for highlighting is ad libitum. As one example, highlighting is realized by displaying the unstocked tool to be used in specific character color (for example, red). Alternatively, highlighting is realized by displaying the unstocked tool to be used in specific background color (for example, red). Alternatively, highlighting is realized by hatching the unstocked tool to be used. Alternatively, highlighting is realized by displaying the unstocked tool to be used in a larger size than the size in which other tools are displayed. In the example of FIG. 10, the unstocked tool is highlighted by hatching.

The notifying method of the unstocked tool to be used is not limited to the example of FIG. 10, and may be alternated by other method in which the operator can grasp the unstocked tool to be used. As one example, only identification information of the unstocked tool to be used may be displayed.

Also, outputting unit 62 displays information indicating whether or not attribution information of the unstocked tool is registered in tool database 130 (see FIG. 9) described above on output screen 80. The information is displayed, for example, in the column of storage location information 91B of output screen 80. As one example, the unstocked tool of which attribution information of tool is registered in tool database 130 is indicated as "Floor". On the other hand, the unstocked tool of which attribution information of tool is not registered in tool database 130 is indicated as "Short".

Attribution information of tool need to be registered before starting machining because it is referenced by a machining program in machining. Attribution information of tool is registered, for example, by using a tool measurer. Such a measuring operation is conducted by an operator present in the measuring room of tool. The measuring operation spends time. Therefore, the time until the operator prepares the tool varies depending on whether or not attribution information of the tool is registered. The operator can prepare the tool more efficiently by checking "Floor" or "Short".

Preferably, outputting unit 62 transmits identification information of the unstocked tool to be used whose attribution information is not registered in tool database 130, to the communication terminal. That is, outputting unit 62 transmits at least identification information of the unstocked tool shown as "Short" to the communication terminal. At this time, identification information of the unstocked tool shown as "Floor" may be transmitted to the communication terminal, and need not be transmitted to the communication terminal.

Typically, the communication terminal that is the destination of transmission is registered in advance. Preferably, the communication terminal that is the destination of transmission includes at least one of a PC in a measuring room of tool, or a portable terminal possessed by the operator who conducts the measuring operation of tool. Accordingly, the operator can easily grasp the unstocked tool for which a measuring operation and a registering operation should be made.

Also, outputting unit 62 calculates a remaining time from the present until the unstocked tool to be used becomes required in tool transport system 10, and displays the remaining time on output screen 80. The remaining time is displayed, for example, in the column of remaining time information 91A of output screen 80. The remaining time corresponds to a grace period for the operator to prepare the tool. Hereinafter, the remaining time is also referred to as "grace period".

As one example, the grace period is calculated on the basis of machining schedule 126 (see FIG. 8) described above. As described above, in machining schedule 126, a machining start time and a machining end time of each workpiece are defined for each machine tool 400. Also, as described above, the tool required for machining of each workpiece is defined in workpiece database 124 (see FIG. 8) described above. Therefore, outputting unit 62 is capable of specifying the time at which each tool becomes required by referring to workpiece database 124 and machining schedule 126. Outputting unit 62 calculates the time from the present to the specified time as a grace period, and displays the grace period in remaining time information 91A. The operator can grasp to what time the unstocked tool to be used should be prepared by checking the grace time shown in remaining time information 91A.

Preferably, outputting unit 62 displays on output screen 80 identification information of an unstocked tool for which the remaining time shown in remaining time information 91A is the shortest among the unstocked tools to be used, while more highlighting the identification information of the unstocked tool than identification information of other unstocked tools.

The method for highlighting is ad libitum. As one example, the highlighting is realized by displaying identification information of the unstocked tool for which the remaining time is the shortest in specific character color (for example, red). Alternatively, the highlighting is realized by displaying identification information of the unstocked tool for which the remaining time is the shortest in specific background color (for example, red). Alternatively, the highlighting is realized by hatching identification information of the unstocked tool for which the remaining time is the shortest. Alternatively, the highlighting is realized by displaying the unstocked tool for which the remaining time is the shortest in a larger size than the size in which identification information of other tools is displayed. As a result, the operator becomes easier to specify the unstocked tool that should be prepared at a higher priority.

E. Modified Example

Figure 11:
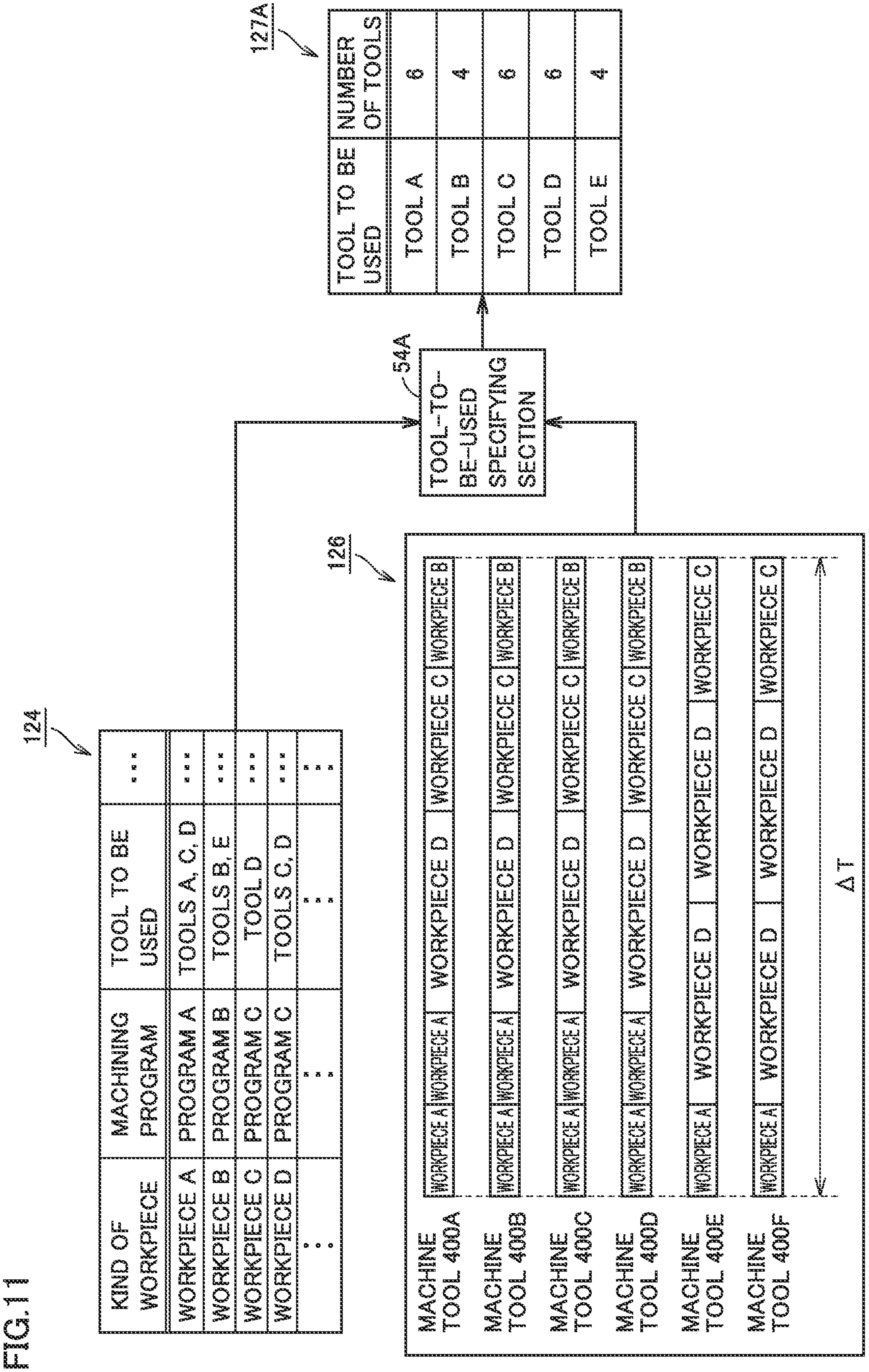
FIG. 11 is a diagram schematically showing a process of specifying a tool to be used.
Figure 13:
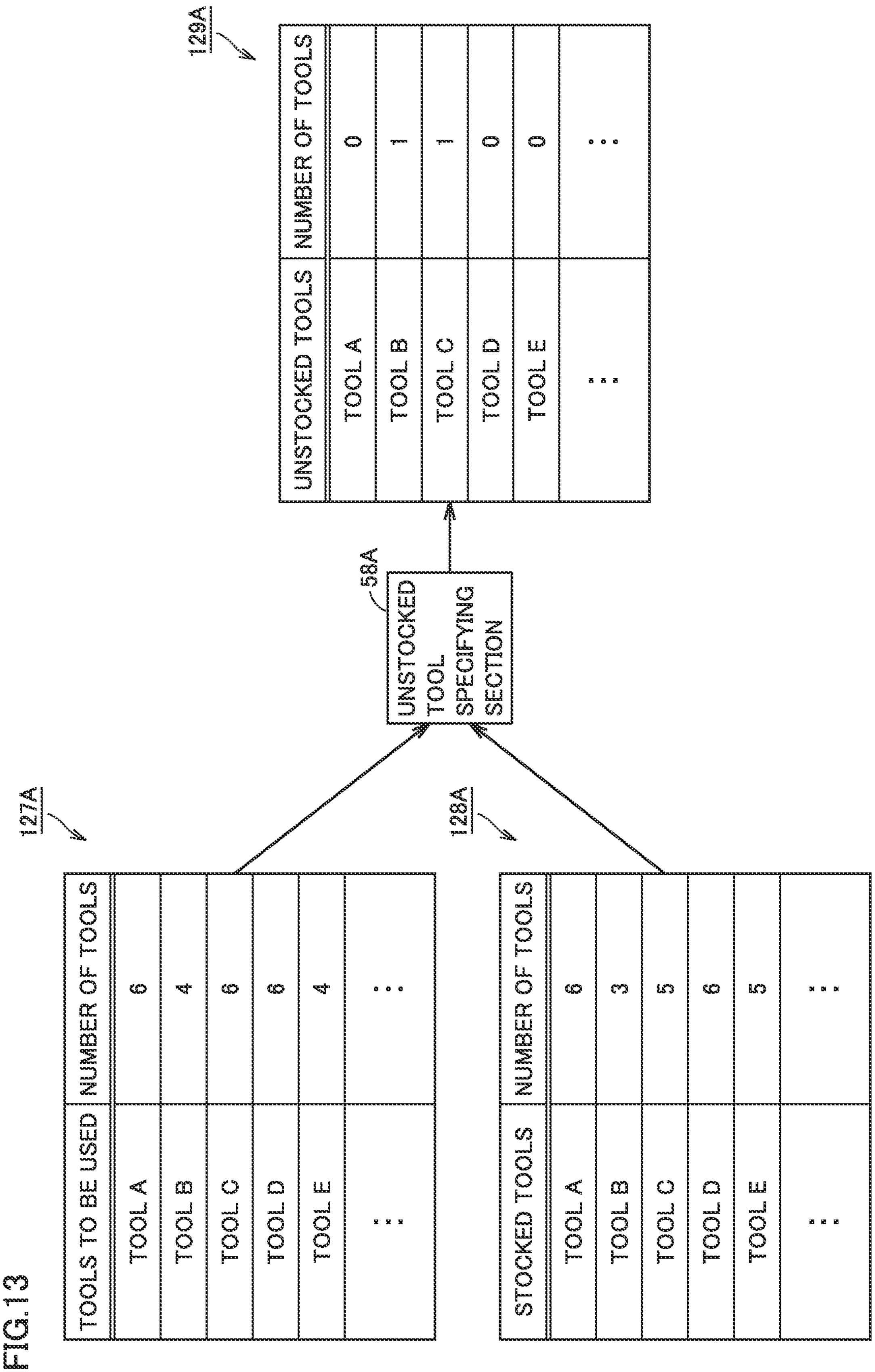
FIG. 13 is a diagram schematically showing a process of specifying an unstocked tool.

Next, referring to FIG. 11 to FIG. 13, tool transport system 10 according to a modified example is described.

Tool transport system 10 described above specifies an unstocked tool to be used, and outputs identification information of the unstocked tool. In contrast, tool transport system 10 according to the modified example specifies the number of the unstocked tools, and further outputs the number of the unstocked tools. As a result, the operator can easily grasp how many tools should be prepared.

Referring to FIG. 11, function of a tool-to-be-used specifying unit 54A according to a modified example is described. FIG. 11 is a diagram schematically showing a process of specifying a tool to be used by tool-to-be-used specifying unit 54A.

Tool-to-be-used specifying unit 54A specifies the tools to be used in machine tools 400A to 400F and the number of tools to be used for each kind of tool on the basis of machining schedule 126 described above.

More specifically, first, tool-to-be-used specifying unit 54A extracts information of the period from the present to a predetermined time ΔT past in machining schedule 126. The length of time ΔT can be set ad libitum by a user. The length of time ΔT is set, for example, to be several minutes or several hours.

Next, tool-to-be-used specifying unit 54A specifies a tool to be used in machining of each workpiece defined in machining schedule 126 by referring to workpiece database 124 described above.

Then, tool-to-be-used specifying unit 54A specifies the maximum number of tools that is to be used at once for each tool, and acquires the specified information as tool-to-be-used information 127A.

In the example of tool-to-be-used information 127A shown in FIG. 11, it is shown that up to six tools "A" are used at once. It is shown that up to four tools "B" are used at once. It is shown that up to six tools "C" are used at once. It is shown that up to six tools "D" are used at once. It is shown that up to four tools "E" are used at once.

As described above, tool-to-be-used information 127A shown in FIG. 11 is different from tool-to-be-used information 127 shown in FIG. 3 in that not only identification information of each tool that is to be used in machine tool 400 within a predetermined time from the present but also the number of each tool that is to be used at once is defined.

Next, referring to FIG. 12, stocked tool information 128A according to a modified example is described. FIG. 12 is a view showing stocked tool information 128A according to a modified example.

Stocked tool information 128A shown in FIG. 12 is different from stocked tool information 128 shown in FIG. 3 in that not only identification information of each tool stocked by tool transport system 10 but also the number of each tool is defined.

Next, referring to FIG. 13, function of an unstocked tool specifying unit 58A according to a modified example is described. FIG. 13 is a diagram schematically showing a process of specifying an unstocked tool by unstocked tool specifying unit 58A.

Unstocked tool specifying unit 58A specifies the number of unstocked tools to be used for each kind of tool on the basis of tool-to-be-used information 127A and stocked tool information 128A. More specifically, unstocked tool specifying unit 58A subtracts the number of each tool defined in stocked tool information 128A from the number of the same kind of tool defined in tool-to-be-used information 127A, and outputs a result of the subtraction as unstocked tool information 129A. Since the tool showing a subtraction result of smaller than 0 is stocked more than enough in tool transport system 10, unstocked tool specifying unit 58A determines the subtraction result as 0.

Outputting unit 62 outputs the number of unstocked tools together with identification information of unstocked tool to be used to other device. The output destination of the unstocked tool by outputting unit 62 is ad libitum. As a result, the operator can grasp the number of unstocked tools to be prepared.

F. Tool Carrying-In Step Into Tool Storage Unit 250

Figure 14:
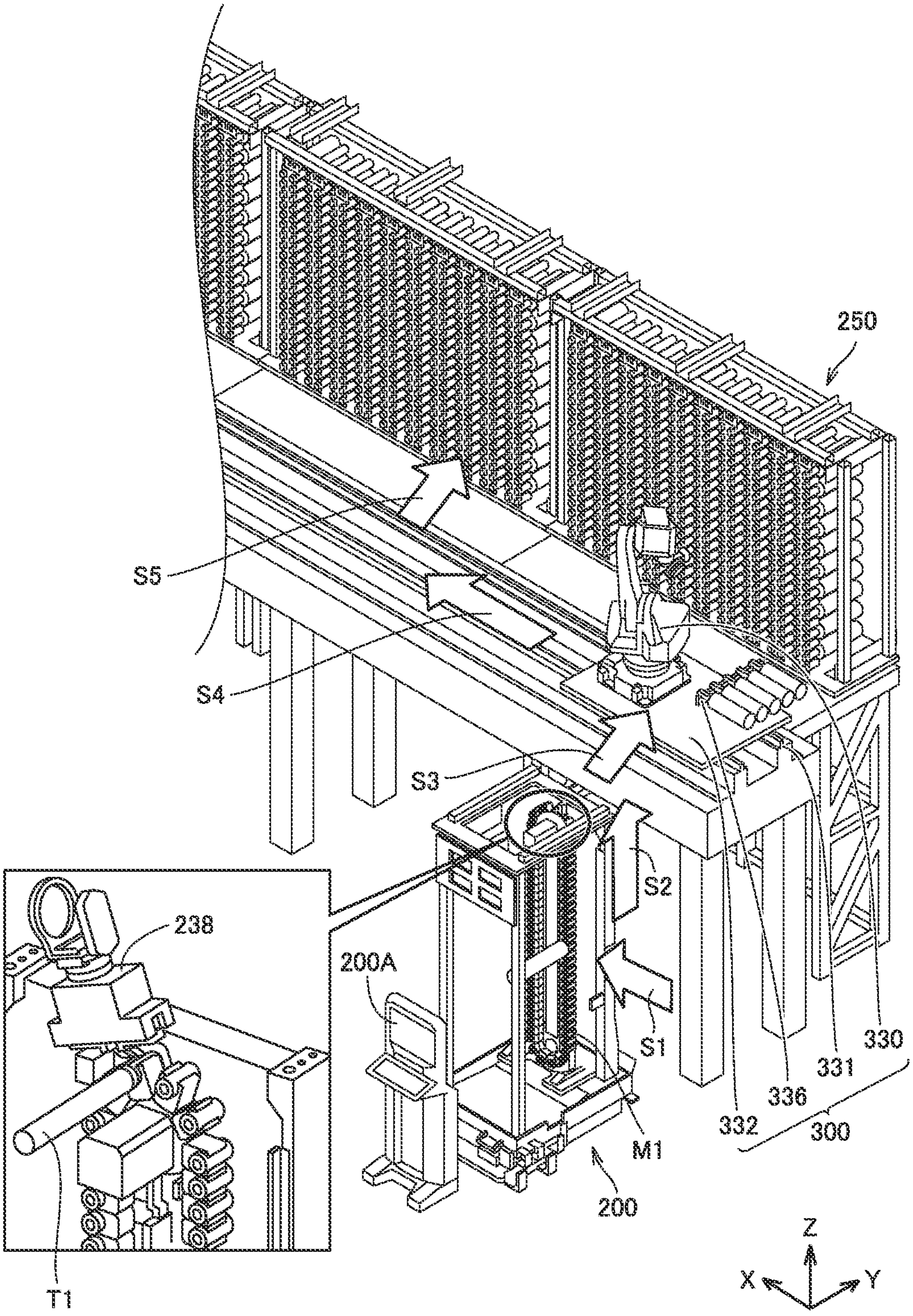
FIG. 14 is a view schematically showing a flow of a tool carrying-in step from a tool setup device to a tool storage unit.

Next, referring to FIG. 14 and FIG. 15, a tool carrying-in step is described. FIG. 14 is a view schematically showing a flow of a tool carrying-in step from tool setup device 200 to tool storage unit 250.

In step S1, an operator sets a tool T1 to be carried-in in magazine M1. Near the position to which tool T1 is to be set, a reading device (not shown) for a bar code or a QR code (registered tradename) is provided, and the reading device reads a bar code or a QR code given to tool T1. Thus, identification information of tool T1 to be carried-in is read. Upon completion of the setting of tool T1, the operator performs completion operation on operation terminal 200A.

Next, in step S2, controller 50 controls motor 235A (see FIG. 2), and drives magazine M1 in tool setup device 200. Thus, controller 50 moves tool T1 to be carried-in to a predetermined tool change position. Near the tool change position, an ATC (Automatic Train Control) 238 is provided. ATC 238 detaches tool T1 at the tool change position from magazine M1 and makes a half turn.

Next, in step S3, arm robot 330 detaches tool T1 from ATC 238, and places tool T1 on a temporary placing area 336 on carriage 332. When there is other tool to be carried-in, the process of steps S1 to S3 is repeated unless the maximum number of storage of temporary placing area 336 is exceeded.

Next, in step S4, controller 50 controls motor 335A, and drives carriage 332. Thus, controller 50 moves carriage 332 to an instructed tool carrying-in position. The tool carry-in position is determined, for example, on the basis of storage information 174 shown in FIG. 15.

FIG. 15 is a chart showing one example of data structure of storage information 174. In storage information 174, each storage location in tool storage unit 250, coordinate values of the storage location, identification information of a tool stored in the storage location, a storage state of the tool in the storage location, and a residual service life of the tool stored in the storage location are associated with each other.

The storage location defined in storage information 174 may be indicated by a number such as ID, and may be indicated by a storage location name. Coordinate values of storage location defined in storage information 174 may be defined two-dimensionally, and may be defined three-dimensionally. In the example of FIG. 15, the coordinate values are indicated by a coordinate value "x" in the direction parallel with rail 331, and a coordinate value "z" in the vertical direction. Identification information of tool defined in storage information 174 may be indicated by a tool number such as ID, and may be indicated by a tool name. A storage state defined in storage information 174 indicates, for example, whether the storage location is vacant or not, or whether the tool stored in the storage location is normal or not. A residual service life of tool defined in storage information 174 may be indicated by a current total use time to a maximum usable time of the tool, and may be indicated by a current total number of use times to a maximum usable times of the tool.

Controller 50 determines a storage destination of tool T1 by referring to a vacant storage location defined in storage information 174. When there are a plurality of vacant storage locations, controller 50 may determine one storage location randomly selected from the plurality of vacant storage locations as a storage destination, and may determine one storage location located closer to transport device 300 selected from the plurality of vacant storage locations as a storage destination.

Referring again to FIG. 14, in step S5, arm robot 330 detaches tool T1 to be carried-in from temporary placing area 336, and stores tool T1 in the determined storage destination. Thereafter, controller 50 writes the storage location of tool T1 and the identification information of tool T1 to storage information 174.

When other tool to be carried-in is left on temporary placing area 336, controller 50 repeats the process of steps S4, S5 until there is no tool on temporary placing area 336.

G. Step of Carrying-In Tool Into Machine Tool 400

Figure 16:
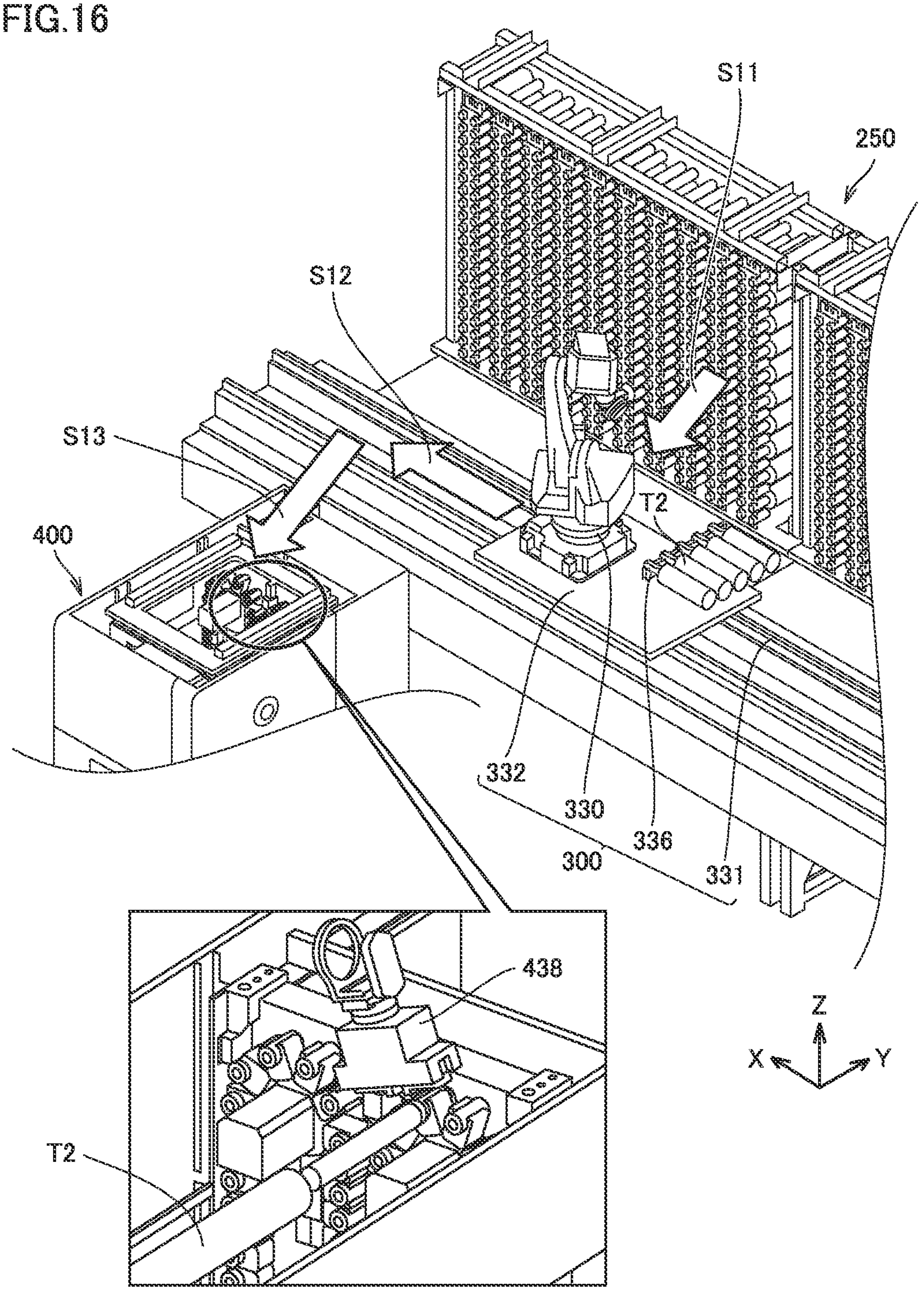
FIG. 16 is a view schematically showing a flow of a tool carrying-in step from the tool storage unit to a machine tool.

Next, referring to FIG. 16, a tool carrying-in step following FIG. 14 is described. FIG. 16 is a view schematically showing a flow of a tool carrying-in step from tool storage unit 250 to machine tool 400.

The case that controller 50 receives a transport instruction for a tool T2 to machine tool 400 is assumed. Tool T2 to be transported, and machine tool 400 that is a transport destination are designated, for example, on operation terminal 200A by the operator. Controller 50 determines a storage location of tool T2 from storage information 174 (see FIG. 15) described above on the basis of reception of the transport instruction for tool T2. Thereafter, controller 50 drives carriage 332 by controlling motor 335A (see FIG. 2), and moves carriage 332 to the front of the storage location of tool T2.

Next, in step S11, arm robot 330 takes tool T2 to be transported out of tool storage unit 250, and places tool T2 on temporary placing area 336 on carriage 332.

Next, in step S12, controller 50 drives carriage 332 to the position of machine tool 400 that is a transport destination by controlling motor 335A.

Next, in step S13, arm robot 330 passes tool T2 to an ATC 438 provided in machine tool 400 that is a transport destination. Thereafter, ATC 438 attaches tool T2 received from arm robot 330 to ATC 438 in machine tool 400. Thereafter, ATC 438 sets tool T2 in magazine in machine tool 400. Thus, tool T2 becomes ready to use in machine tool 400.

H. Tool Carrying-Out Step to Tool Setup Device 200

Figure 17:
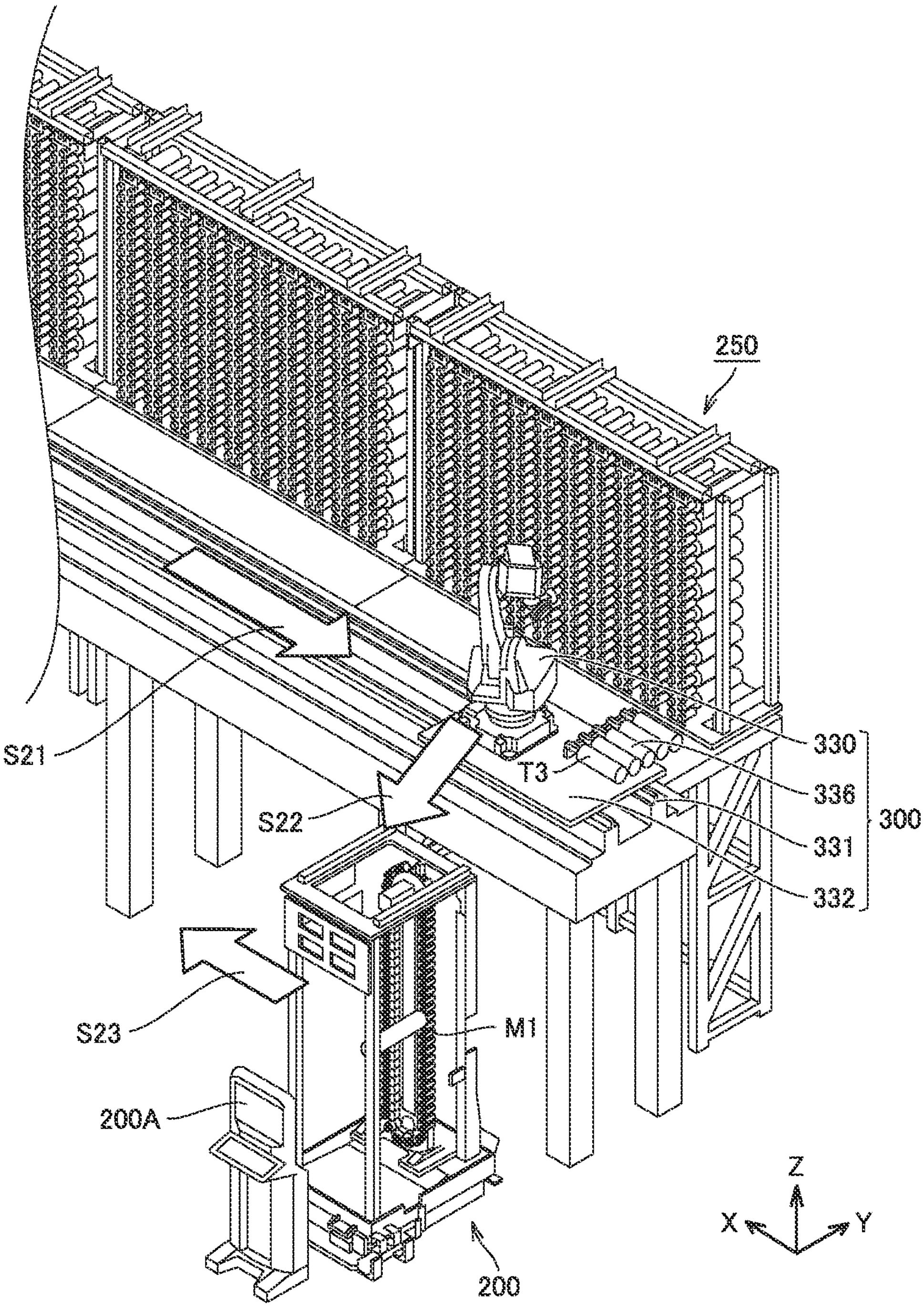
FIG. 17 is a view schematically showing a flow of a tool carrying-out step from the tool storage unit to the tool setup device.

Next, referring to FIG. 17, a tool carrying-out step is described. FIG. 17 is a view schematically showing a flow of a tool carrying-out step from tool storage unit 250 to tool setup device 200.

The case that controller 50 receives a transport instruction for a tool T3 to tool setup device 200 is assumed. Based on this, controller 50 determines a storage destination of tool T3 based on storage information 174 (see FIG. 15) described above. Thereafter, controller 50 drives carriage 332 by controlling motor 335A (see FIG. 2) described above, and moves carriage 332 to the front of the storage location of tool T3. Next, arm robot 330 takes tool T3 out of tool storage unit 250, and places tool T3 on temporary placing area 336 on carriage 332. Also, controller 50 deletes the identification information of tool T3 from storage information 174, and rewrites the storage source of tool T3 to a vacant state.

Next, in step S21, controller 50 drives carriage 332 by controlling motor 335A described above, and moves carriage 332 to the front of tool setup device 200.

Next, in step S22, arm robot 330 detaches tool T3 to be carried-out from temporary placing area 336, and attaches tool T3 to ATC 238 (see FIG. 14) described above provided in tool setup device 200. Thereafter, ATC 238 attaches tool T3 to magazine M1 of tool setup device 200.

Next, in step S23, controller 50 drives magazine M1 by controlling motor 235A described above, and moves tool T3 to be carried-out to an exit. Thereafter, the operator takes tool T3 to be carried-out thorough the exit.

I. Hardware Configuration of Management Device 100

Figure 18:
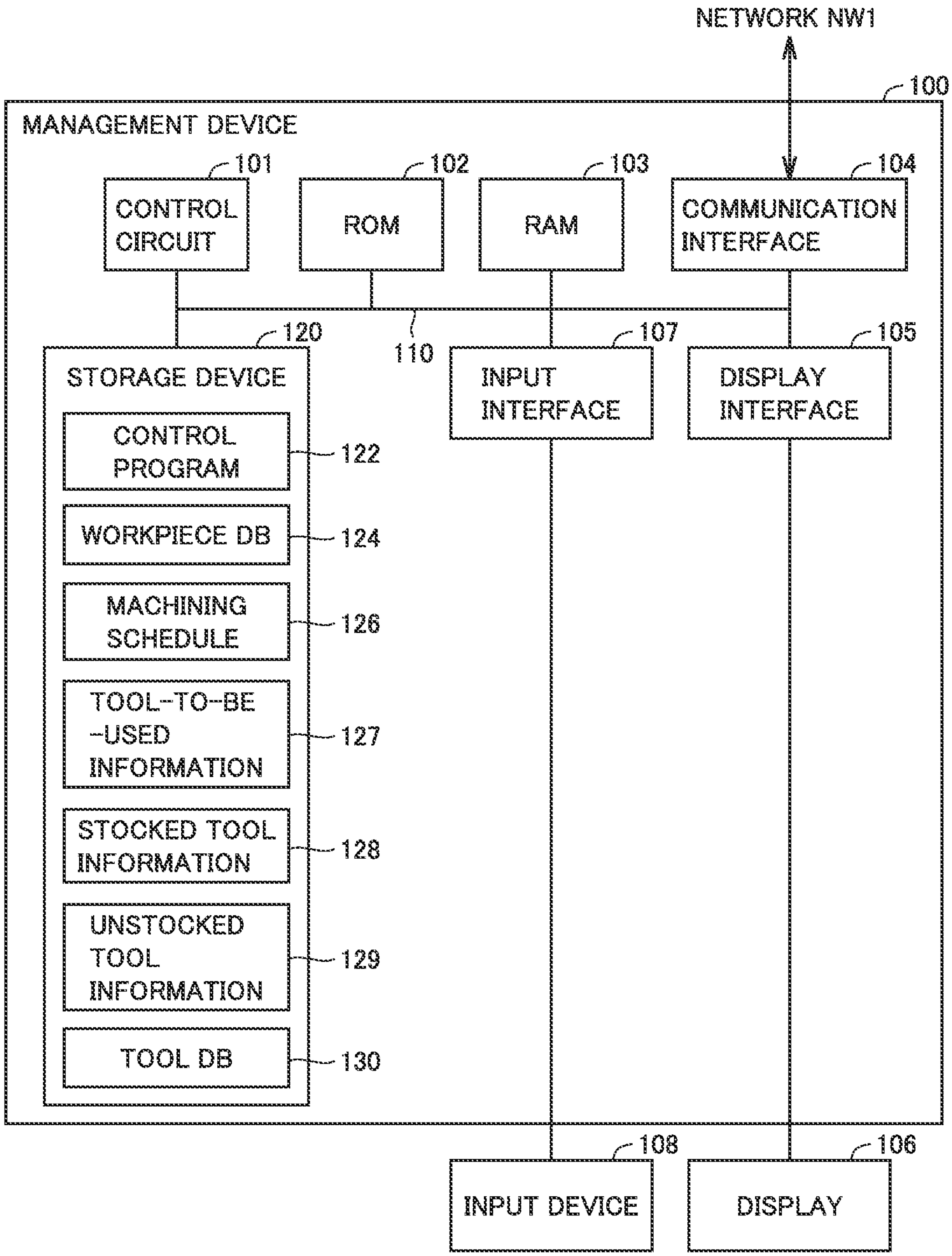
FIG. 18 is a diagram showing one example of hardware configuration of a management device.

Next, referring to FIG. 18, hardware configuration of management device 100 shown in FIG. 2 is described. FIG. 18 is a diagram showing one example of hardware configuration of management device 100.

Management device 100 includes a control circuit 101, a ROM (Read Only Memory) 102, a RAM (Random Access Memory) 103, a communication interface 104, a display interface 105, an input interface 107, and a storage device 120. These components are connected to a bus 110.

Control circuit 101 is configured, for example, by at least one integrated circuit. The integrated circuit can be configured by, for example, at least one CPU (Central Processing Unit), at least one GPU (Graphics Processing Unit), at least one ASIC (Application Specific Integrated Circuit), at least one FPGA (Field Programmable Gate Array), or combination thereof and the like.

Control circuit 101 controls operations of management device 100 by executing a control program 122 and various programs of an operating system or the like. Control circuit 101 reads out control program 122 from storage device 120 or ROM 102 to RAM 103 on the basis of reception of a command for executing control program 122. RAM 103 functions as working memory, and temporarily stores various data required for executing control program 122.

To communication interface 104, LAN (Local Area Network), antenna and the like are connected. Management device 100 is connected to network NW1 via communication interface 104. Thus, management device 100 exchanges data with an external device connected to network NW1. The external device includes, for example, PLC 150, a server (not shown) and the like.

To display interface 105, a display 106 is connected. Display interface 105 transmits an image signal for displaying an image to display 106 according to a command from control circuit 101 or the like. Display 106 displays, for example, an operation screen for receiving a tool carrying-in instruction, or a selection screen for designating a tool to be transported. Display 106 is, for example, a liquid crystal display, an inorganic EL (Electro Luminescence) display, or other display device. Display 106 may be configured integrally with management device 100, and may be configured separately from management device 100.

To input interface 107, an input device 108 is connected. Input device 108 is, for example, a mouse, a keyboard, a touch panel, or other device capable of receiving an operation by a user. Input device 108 may be configured integrally with management device 100, and may be configured separately from management device 100.

Storage device 120 is, for example, a storage medium such as hard disc or flush memory. Storage device 120 stores control program 122, workpiece database 124 described above, machining schedule 126 described above, stocked tool information 128 described above, tool database 130 described above and so on. The storage location of these is not limited to storage device 120, and these may be stored in a storage area of control circuit 101 (for example, cash memory and the like), ROM 102, RAM 103, other devices (for example, server, PLC 150 or operation terminal 200A) and the like.

Control program 122 is a program for realizing part or all of the functional constituents shown in FIG. 4. Control program 122 may be provided as a part of a desired program to which it is incorporated rather than as a single program. In this case, the transport control processing by control program 122 is realized in cooperation with the desired program. Such a program without some module does not apart from the scope of control program 122 according to the present embodiment. Further, part or all of the functions provided by control program 122 may be realized by dedicated hardware. Further, management device 100 may be configured in a form of a so-called cloud service in which at least one server executes part of the processing of control program 122.

J. Hardware Configuration of PLC 150

Figure 19:
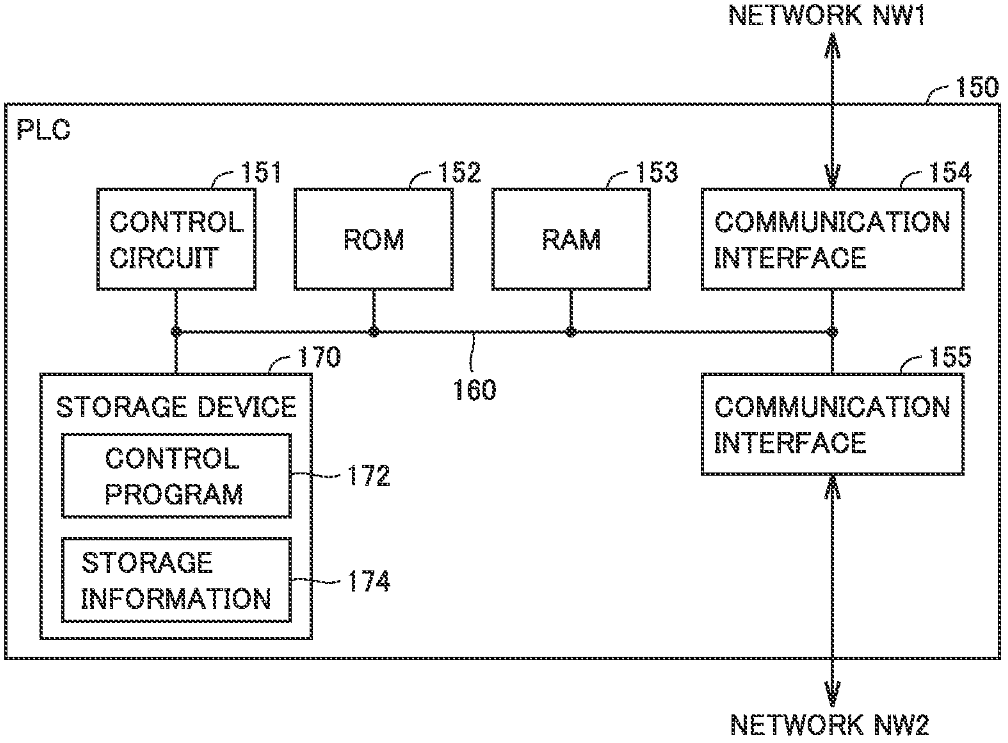
FIG. 19 is a block diagram showing principal hardware configuration of PLC (Programmable Logic Controller).

Referring to FIG. 19, one example of hardware configuration of PLC 150 shown in FIG. 2 is described. FIG. 19 is a block diagram showing a principal hardware configuration of PLC 150.

PLC 150 includes a control circuit 151, a ROM (Read Only Memory) 152, a RAM (Random Access Memory) 153, a communication interfaces 154, 155, and a storage device 170. These components are connected to a bus 160.

Control circuit 151 is configured by at least one integrated circuit. The integrated circuit is configured, for example, by at least one CPU, at least one MPU (Micro Processing Unit), at least one ASIC, at least one FPGA or combination thereof or the like.

Control circuit 151 controls operations of transport device 300, machine tool 400 and the like by executing various programs such as a control program 172. Control circuit 151 reads out control program 172 from storage device 170 into ROM 152 on the basis of reception of a command for executing control program 172. RAM 153 functions as working memory, and temporarily stores various data required for executing control program 172.

To communication interface 154, LAN, an antenna and the like are connected. PLC 150 is connected to network NW1 via communication interface 154. Thus, PLC 150 exchanges data with an external device connected to network NW1. The external device includes, for example, management device 100, a server (not shown) and the like.

Communication interface 155 is an interface for connecting to network NW2 which is a filed network. PLC 150 exchanges data with an external device connected to network NW2 via communication interface 155. The external device includes, for example, remote I/O units 71 to 73 described above.

Storage device 170 is, for example, a storage medium such as hard disc or flush memory. Storage device 170 stores control program 172 and storage information 174 (see FIG. 15) described above, and so on. The storage location of these is not limited to storage device 170, and these may be stored in a storage area of control circuit 151 (for example, cash area and the like), ROM 152, RAM 153, an external device (for example, server) and the like.

Control program 172 is a program for realizing part or all of the functional constituents shown in FIG. 4. Control program 172 may be provided as a part of a desired program to which it is incorporated, rather than as a single program. In this case, the control processing according to the present embodiment is realized in cooperation with the desired program. Such a program without some module does not apart from the scope of control program 172 according to the present embodiment. Further, part or all of the functions provided by control program 172 may be realized by dedicated hardware. Further, PLC 150 may be configured in a form of a so-called cloud service in which at least one server executes part of the processing of control program 172.

K. Hardware Configuration of Operation Terminal 200A

Figure 20:
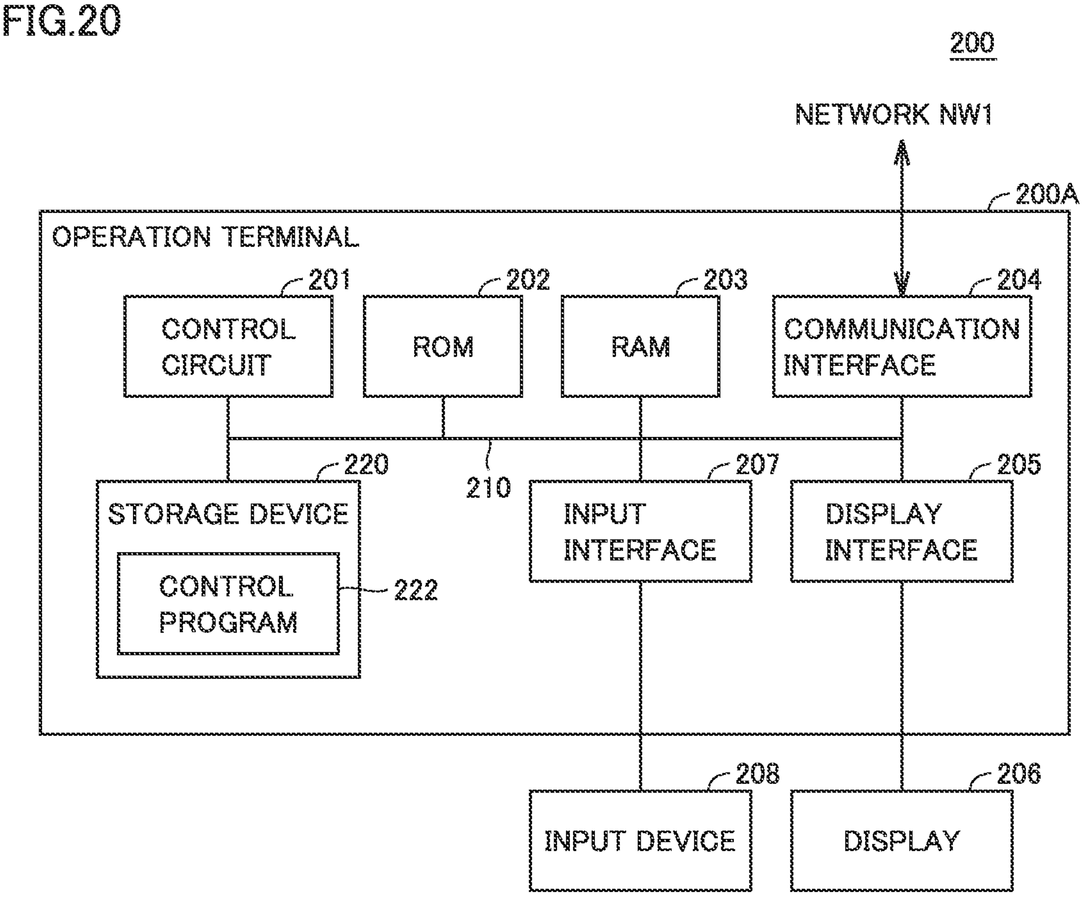
FIG. 20 is a diagram showing one example of hardware configuration of an operation terminal.

Referring to FIG. 20, hardware configuration of operation terminal 200A shown in FIG. 1 is described. FIG. 20 is a diagram showing one example of hardware configuration of operation terminal 200A.

Operation terminal 200A includes a control circuit 201, a ROM 202, a RAM 203, a communication interface 204, a display interface 205, an input interface 207, and a storage device 220. These components are connected to a bus 210.

Control circuit 201 is configured, for example, by at least one integrated circuit. The integrated circuit can be configured, for example, by at least one CPU, at least one GPU, at least one ASIC, at least one FPGA or combination thereof or the like.

Control circuit 201 controls operations of operation terminal 200A by executing a control program 222 and various programs of an operating system or the like. Control circuit 201 reads out control program 222 from storage device 220 or ROM 202 into RAM 203 on the basis of reception of a command for executing control program 222. RAM 203 functions as working memory, and temporarily stores various data required for executing control program 222.

To communication interface 204, LAN, an antenna and the like are connected. Operation terminal 200A is connected to network NW1 via communication interface 204. Thus, operation terminal 200A exchanges data with an external device connected to network NW1. The external device includes, for example, PLC 150, a server (not shown) and the like.

To display interface 205, a display 206 is connected. Display interface 205 transmits an image signal for displaying an image to display 206 according to a command from control circuit 201 or the like. Display 206 displays, for example, an operation screen for receiving a tool carrying-in instruction, a tool selection screen for designating a tool to be transported, or a machine tool selection screen for designating machine tool 400 that is a transport destination. Display 206 is, for example, a liquid crystal display, an inorganic EL display, or other display device. Display 206 may be configured integrally with operation terminal 200A, and may be configured separately from operation terminal 200A.

To input interface 207, an input device 208 is connected. Input device 208 is, for example, a mouse, a keyboard, a touch panel, or other device capable of receiving an operation by a user. Input device 208 may be configured integrally with operation terminal 200A, and may be configured separately from operation terminal 200A.

Storage device 220 is, for example, a storage medium such as hard disc or flush memory. Storage device 220 stores control program 222 and the like. The storage location of control program 222 is not limited to storage device 220, and these may be stored in a storage area of control circuit 201 (for example, cash memory and the like), ROM 202, RAM 203, an external device (for example, server) and the like.

Control program 222 is a program for realizing part or all of the functional constituents shown in FIG. 4. Control program 222 may be provided as a part of a desired program to which it is incorporated rather than as a single program. In this case, the control processing by control program 222 is realized in cooperation with the desired program. Such a program without some module does not apart from the scope of control program 222 according to the present embodiment. Further, part or all of the functions provided by control program 222 may be realized by dedicated hardware. Further, operation terminal 200A may be configured in a form of a so-called cloud service in which at least one server executes part of the processing of control program 222.

L. Flowchart

Figure 21:
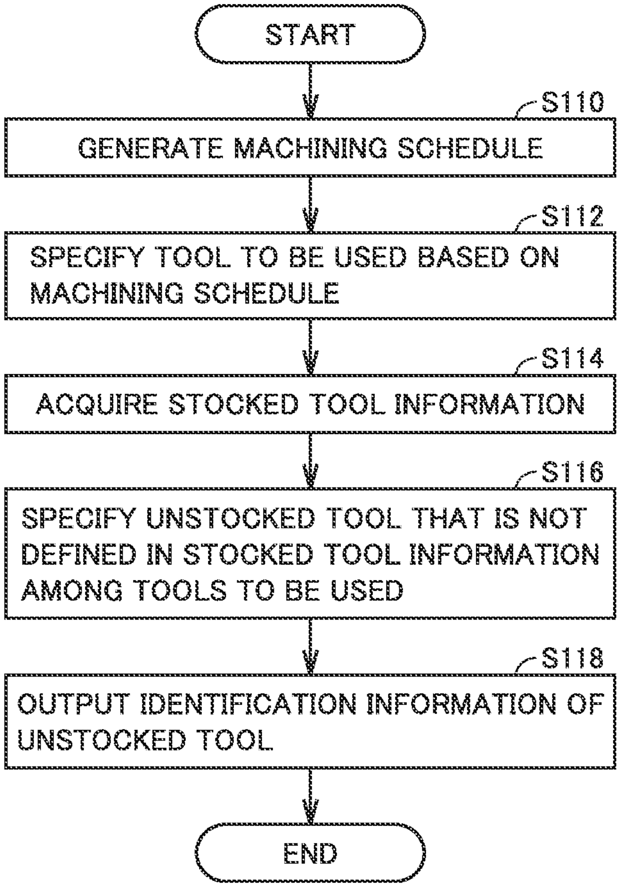
FIG. 21 is a flowchart showing a process of outputting identification information of an unstocked tool to be used.

Next, referring to FIG. 21, a control flow in outputting identification information of an unstocked tool to be used is described. FIG. 21 is a flowchart showing a process of outputting identification information of an unstocked tool to be used.

Part or all the processing shown in FIG. 21 is defined in control program 122 (see FIG. 18) described above. Alternatively, part or all the processing shown in FIG. 21 is defined in control program 172 (see FIG. 19) described above. Alternatively, part or all the processing shown in FIG. 21 is defined in control program 222 (see FIG. 20) described above. Alternatively, part or all the processing shown in FIG. 21 may be executed by a circuit element or other hardware.

In strep S110, controller 50 functions as schedule generating unit 52 (see FIG. 4) described above, and generates machining schedule 126 on the basis of machining setting 123 and workpiece database 124. Since the function of schedule generating unit 52 is as described above, the description thereof will not be repeated.

In step S112, controller 50 functions as tool-to-be-used specifying unit 54 (see FIG. 4) described above, and specifies tools to be used in tool transport system 10 in the period from the present to a predetermined time past on the basis of workpiece database 124 and machining schedule 126. Since the function of tool-to-be-used specifying unit 54 is as described above, the description thereof will not be repeated.

In step S114, controller 50 functions as stocked tool acquiring unit 56 (see FIG. 4) described above, and acquires stocked tool information 128. In stocked tool information 128, identification information of each tool stocked by tool transport system 10 is defined. Since the function of stocked tool acquiring unit 56 is as described above, the description thereof will not be repeated.

In step S116, controller 50 functions as unstocked tool specifying unit 58 (see FIG. 4) described above, and specifies tools other than the tool to be used that is specified in step S112 among the tools defined in stocked tool information 128 as unstocked tools. Since the function of unstocked tool specifying unit 58 is as described above, the description thereof will not be repeated.

In step S118, controller 50 functions as outputting unit 62 (see FIG. 4) described above, and outputs identification information of the unstocked tool to be used, specified in step S116 to a predetermined output destination. Since the function of outputting unit 62 is as described above, the description thereof will not be repeated.

M. Conclusion

In the manner as described above, tool transport system 10 specifies an unstocked tool that is not stocked by tool transport system 10 among tools to be used in the period from the present to a predetermined time past, and displays identification information of the unstocked tool on a display. Accordingly, the operator can recognize an unstocked tool to be used before starting of machining, and has enough time to prepare the unstocked tool.

It is to be understood that the embodiments disclosed herein are illustrative, but are not restrictive in every respect. The scope of the present invention is indicated by the appended claims rather than by the description described above, and it is intended that all modifications within the equivalent meaning and scope of the claims are included.

REFERENCE SIGNS LIST

10: tool transport system, 50: controller, 52: schedule generating unit, 54, 54A: tool-to-be-used specifying unit, 56: stocked tool acquiring unit, 58, 58A: unstocked tool specifying unit, 60: tool setting unit, 62: outputting unit, 71, 72, 73: remote I/O unit, 80: output screen, 90, 126: machining schedule, 90A: sequence number, 90B: date information, 90C: machining start information, 90D: identification information of machine tool, 90E: tool group, 90F: machining time information, 91: tool information, 91A: remaining time information, 91B: storage location information, 91C: tool identification information, 91D: reference information, 91E: service life information, 100: management device, 101, 151, 201: control circuit, 102, 152, 202: ROM, 103, 153, 203: RAM, 104, 154, 155, 204: communication interface, 105, 205: display interface, 106, 206: display, 107, 207: input interface, 108, 208: input device, 110, 160, 210: bus, 120, 170, 220: storage device, 122, 172, 222: control program, 123: machining setting, 124: workpiece database, 127, 127A: tool-to-be-used information, 128, 128A: stocked tool information, 129, 129A: unstocked tool information, 130: tool database, 174: storage information, 200: tool setup device, 200A: operation terminal, 234, 234A, 234B, 334, 334A, 334B, 411, 411A, 411B: motor driver, 235, 235A, 235B, 335, 335A, 335B, 412, 412A, 412B: motor, 238, 438: ATC, 250: tool storage unit, 300: transport device, 330: arm robot, 331: rail, 332: carriage, 336: temporary placing area, 400, 400A, 400D, 400E, 400F: machine tool

The invention claimed is:

1. A tool transport system comprising: a display unit;

a plurality of machine tools;

a tool storage unit that stores a plurality of tools;

a transport device that transports a designated tool among tools stored in the tool storage unit, to a designated machine tool among the plurality of machine tools;

a tool setup device that is set a tool to be carried-in to the tool storage and the tool set to the setup device is transported to the tool storage unit by the transport device; and a controller that controls the tool transport system, the controller executing:

a process of managing stocked tool information defining identification information of each tool stocked by the tool transport system, wherein the process of managing includes:

a process of writing identification information of the tool into the stocked tool information on the basis that the tool is set in the tool setup device;

a process of deleting identification information of the tool from the stocked tool information on the basis that the tool is removed from the tool setup device;

a process of acquiring the stocked tool information;

a process of specifying a plurality of tools to be used in the plurality of machine tools based on a machining schedule of workpiece in the plurality of machine tools;

a process of specifying an unstocked tool that is not defined in the stocked tool information among the plurality of tools to be used; and a process of displaying identification information of the unstocked tool on the display unit, wherein the controller executes:

a process of calculating a remaining time for the unstocked tool to become required in the tool transport system from the present time based on the machining schedule; and a process of displaying the remaining time for the unstocked tool on the display unit.

2. The tool transport system according to claim 1, further comprising a tool database, the tool database including identification information of a plurality of tools, the controller further executing:

a process of associating attribution information of tool to identification information of the tool in the tool database based on reception of input of the attribution information of the tool; and a process of displaying information indicating whether or not the attribution information of the unstocked tool is registered in the tool database on the display unit.

3. The tool transport system according to claim 2, wherein the tool transport system is configured to be communicable with a communication terminal, and the controller further executes a process of transmitting identification information of an unstocked tool for which the attribution information is not registered in the tool database, to the communication terminal.

4. The tool transport system according to claim 1, wherein the controller displays identification information of an unstocked tool for which the remaining time is shorter than different unstocked tools from the unstocked tool on the display unit while highlighting the identification information of the unstocked tool more than different identification information of the different unstocked tools.

5. A control method for a tool transport system, the tool transport system comprising:

a display unit;

a plurality of machine tools;

a tool storage unit that stores a plurality of tools;

a transport device that transports a designated tool among tools stored in the tool storage unit, to a designated machine tool among the plurality of machine tools; and a tool setup device that is set a tool to be carried-in to the tool storage and the tool set to the setup device is transported to the tool storage unit by the transport device;

the control method including:

managing stocked tool information defining identification information of each tool stocked by the tool transport system;

the managing including:

writing identification information of the tool into the stocked tool information on the basis that the tool is set in the tool setup device;

deleting identification information of the tool from the stocked tool information on the basis that the tool is removed from the tool setup device;

acquiring the stocked tool information;

specifying a plurality of tools to be used in the plurality of machine tools based on a machining schedule of workpiece in the plurality of machine tools;

specifying an unstocked tool that is not defined in the stocked tool information among the plurality of tools to be used; and displaying identification information of the unstocked tool on the display unit, the control method including:

calculating a remaining time for the unstocked tool to become required in the tool transport system from the present time based on the machining schedule; and displaying the remaining time for the unstocked tool on the display unit.

6. A non-transitory computer-readable medium storing a control program for a tool transport system, the tool transport system comprising:

a display unit;

a plurality of machine tools;

a tool storage unit that stores a plurality of tools;

a transport device that transports a designated tool among tools stored in the tool storage unit, to a designated machine tool among the plurality of machine tools;

a tool setup device that is set a tool to be carried-in to the tool storage and the tool set to the setup device is transported to the tool storage unit by the transport device; and a controller that controls the tool transport system, the control program making the controller execute:

managing stocked tool information defining identification information of each tool stocked by the tool transport system;

the managing includes:

writing identification information of the tool into the stocked tool information on the basis that the tool is set in the tool setup device;

deleting identification information of the tool from the stocked tool information on the basis that the tool is removed from the tool setup device;

acquiring the stocked tool information;

specifying a plurality of tools to be used in the plurality of machine tools based on a machining schedule of workpiece in the plurality of machine tools;

specifying an unstocked tool that is not defined in the stocked tool information among the plurality of tools to be used; and displaying identification information of the unstocked tool on the display unit, the tool transport system including:

calculating a remaining time for the unstocked tool to become required in the tool transport system from the present time based on the machining schedule; and displaying the remaining time for the unstocked tool on the display unit.

7. The tool transport system according to claim 1, wherein the controller executing a process of transporting by the transport device the unstocked tool after identified by the process of specifying the unstocked tool.

8. The tool transport system according to claim 1, wherein the tool setup device includes the display unit and the remaining time for the unstocked tool can be seen by an operator who sets the tool to the tool set up device.

9. The tool transport system according to claim 1, wherein the stocked tool information indicates that the tools exist in the tool transport system, and the identification information of the unstocked tool indicates the tools that should be set to the tool setup device by an operator.

* * * * *